United States Patent
Pifko et al.

(10) Patent No.: US 11,183,081 B2
(45) Date of Patent: Nov. 23, 2021

(54) SYSTEM AND METHODS FOR RELATIVE DRIVER SCORING USING CONTEXTUAL ANALYTICS

(71) Applicant: Tourmaline Labs, Inc., San Diego, CA (US)

(72) Inventors: Steven Lloyd Pifko, San Diego, CA (US); Lukas Daniel Kuhn, San Diego, CA (US); Christoph Peter Stüber, Berlin (DE)

(73) Assignee: Tourmaline Labs, Inc., San Diego, CA (US)

( * ) Notice: Subject to any disclaimer, the term of this patent is extended or adjusted under 35 U.S.C. 154(b) by 326 days.

(21) Appl. No.: 16/104,059

(22) Filed: Aug. 16, 2018

(65) Prior Publication Data

US 2019/0066535 A1      Feb. 28, 2019

Related U.S. Application Data

(60) Provisional application No. 62/547,696, filed on Aug. 18, 2017.

(51) Int. Cl.
| | |
|---|---|
| *G09B 19/16* | (2006.01) |
| *G07C 5/08* | (2006.01) |
| *G06Q 10/06* | (2012.01) |
| *G09B 29/00* | (2006.01) |

(52) U.S. Cl.
CPC ..... *G09B 19/167* (2013.01); *G06Q 10/06393* (2013.01); *G07C 5/085* (2013.01); *G09B 29/007* (2013.01)

(58) Field of Classification Search
CPC .................................................. G09B 19/167

USPC ............................................................ 434/65
See application file for complete search history.

(56) References Cited

U.S. PATENT DOCUMENTS

| | | |
|---|---|---|
| 2009/0210257 A1 | 8/2009 | Chalfant et al. |
| 2014/0222245 A1 | 8/2014 | Chang |
| 2014/0272810 A1 | 9/2014 | Fields et al. |
| 2015/0149219 A1 | 5/2015 | Bowne et al. |
| 2015/0233718 A1* | 8/2015 | Grokop ................ G06Q 40/08 701/501 |
| 2015/0332425 A1 | 11/2015 | Kalanick et al. |
| 2016/0232722 A1* | 8/2016 | Morishima ............ G07C 5/06 |
| 2016/0282124 A1* | 9/2016 | Chowdhury ........ G01C 21/165 |
| 2017/0088142 A1 | 3/2017 | Hunt et al. |

OTHER PUBLICATIONS

International Application No. PCT/US2018/046938, International Search Report and Written Opinion, dated Nov. 9, 2018, 9 pages.

* cited by examiner

*Primary Examiner* — Thomas J Hong
(74) *Attorney, Agent, or Firm* — Kilpatrick Townsend & Stockton LLP

(57) ABSTRACT

Embodiments of the present disclosure present systems, devices, methods, and computer readable medium for contextual driver evaluation. The disclosed techniques allow for collecting trip data from various sensors integrated in a mobile device for a user. The techniques include segregating the trip motion data into one or more segments associated with one or more populations with distinct features and characteristics. The trip data can be processed to identify event and behavior features that can be used to evaluate a driver's abilities in a contextually appropriate way. The information for a plurality of drivers can be compared to score the driver's ability amount a plurality of drivers.

20 Claims, 17 Drawing Sheets

| Confidence, $M$ | Scaling factor, $\lambda$ |
|---|---|
| 95% | 5.991 |
| 97.5% | 7.378 |
| 99% | 9.210 |
| 99.5% | 10.597 |
| 99.9% | 13.816 |

| Score | | | | Coaching Feedback |
|---|---|---|---|---|
| Type | Driver | Company | | |
| Total | 68 (+1) | 66 | | Consider the tips below and work on becoming a safe driver. |
| Handling | 67 (+2) | 63 | | Be sure to check that all tires are properly inflated. Tires should... |
| Focus | 68 (+1) | 69 | | Listening to the radio may be affecting your focus. Try turning it... |
| Eco | 66 (+1) | 65 | | Your vehicle is burning fuel faster than it needs to be. Try be... |
| Acceleration | 64 (+2) | 60 | | Look for oncoming traffic in all directions before accelerating,... |
| Braking | 66 (+1) | 63 | | Remember, the faster you drive the more time and distance... |
| Turning | 66 (±0) | 64 | | Remember to slow down driving into a curve. |
| Swerving | 69 (±0) | 68 | | If your vehicle begins to skid, steer in the direction of the skid... |
| Jerking | 65 (+1) | 67 | | Keep your eyes moving for unpredictable changes in traffic... |
| Speeding | 86 (±0) | 74 | | Thank you for keeping your speed. |
| Phone Handling | 77 (±1) | 79 | | Good job reducing your phone usage while driving. Use it... |

Tim Miller
Tourmaline Labs 479
admin@tourmalinelabs.com

| Name | Score | | Report | | Total Miles |
|---|---|---|---|---|---|
| | Driver | Company | Acknowledged | Sent | |
| Justin Miller | 83(-1) | 67 | 1 | 30 | 583 |
| Tom Tait | 79(+1) | 67 | 0 | 27 | 2,665 |
| Hey Tuh | 78(78) | 0 | 0 | 1 | 38 |
| Ricardo Silva | 75(+1) | 67 | 9 | 37 | 13,972 |
| Sam Bortol | 71(±0) | 67 | 5 | 29 | 5,355 |
| Mario Smith | 70(-1) | 67 | 0 | 52 | 17,327 |
| Harry Quinn | 69(-1) | 67 | 0 | 33 | 11,010 |
| Ben Sullivan | 68(-1) | 67 | 2 | 62 | 10,582 |
| Mike Zuniga | 68(±0) | 67 | 9 | 48 | 16,701 |
| Chris Evans | 68(+2) | 67 | 0 | 34 | 10,448 |
| Nick Phillips | 66(+1) | 67 | 7 | 2 | 1,193 |
| Tony Santos | 65(±0) | 67 | 0 | 62 | 8,522 |
| Steven Pifko | 65(-1) | 67 | 0 | 27 | 10,989 |
| Lukas Kuhn | 65(±0) | 67 | 4 | 0 | 867 |
| John Swiss | 63(+1) | 67 | 0 | 37 | 9,868 |
| Stephen Lankford | 59(+2) | 67 | 0 | 16 | 13,154 |
| Mike Mckenna | 58(±0) | 67 | 15 | 25 | 13,964 |
| Lukas Kuhn | 56(±0) | 67 | | 57 | 12,878 |

FIG. 14

SYSTEM AND METHODS FOR RELATIVE DRIVER SCORING USING CONTEXTUAL ANALYTICS

CROSS-REFERENCED TO RELATED APPLICATIONS

This application claims priority to U.S. Provisional Application Ser. No. 62/547,696, filed Aug. 18, 2017 and entitled "System and Method for Relative Driver Scoring Using Contextual Analytics," which is herein incorporated by reference in its entirety and for all purposes.

BACKGROUND

While driver scoring can be done using absolute metrics to quantify driving ability, such methods require a complete, predefined model of what constitutes good driving behavior that applies to all drivers in all conditions. This requires sophisticated modeling, and currently no industry standard exists that defines good driving. Further, a defined driving standard for one condition may not apply to all other conditions (e.g., what constitutes hard braking or proper vehicle speed on a clear, sunny day may be different than during rainy weather). However, a simpler and more powerful method is desired.

BRIEF SUMMARY

Embodiments of the present disclosure can provide devices, methods, and computer-readable medium for implementing user interface for searching digital assets in a digital asset collection. The present disclosure describes the implementation of one or embodiments of a user interface that enables a user to quickly and easily filter and search digital assets in a digital asset collection. The disclosed techniques allow for rapid recall of desired assets with minimal keystrokes, linking assets into logical collections, and providing an overall improved user experience.

In one aspect, a method for scoring driving behavior is disclosed. The method includes obtaining trip data associated with one or more driving trips. The method also includes separating the trip data into one or more trip segments. Each trip segment is associated with one or more populations of a plurality of populations. Each population is associated with one or more population characteristics and one or more population features. Next, the method includes processing the trip data of a first trip segment to identify one or more trip features occurring within the first trip segment. The trip features includes one or more of the following: event features and behavior features. Each event feature indicates an instance in which the processed trip data exceeds one or more event feature thresholds. Each behavior feature corresponds to a representation of a driving condition over the duration of the first trip segment. In some embodiments the driving condition can be vehicle movement, movement of a mobile device, and/or movement of a person or persons. The method also includes determining one or more relative segment scores for the first trip segment. Each relative segment score indicates a comparison between one or more trip features of the first trip segment and one or more population features of the one or more populations.

In some embodiments of the disclosed method, the trip data includes motion data comprising one or more of the following representations of vehicle movements: location, vehicle bearing, velocity, acceleration, jerk, altitude, vehicle rotation (e.g., rolling, flipping, etc.), vehicle skidding/sliding, and collisions. In some embodiments these representations of vehicle movement can be discrete. In some embodiments these representations of a driving condition can be continuous. In some embodiments these representations of vehicle movement can be time series. In some embodiments, these can be a collection of events or represented in the frequency domain.

In some embodiments of the disclosed method a plurality of nonconsecutive trip segments associated with the same population are processed as one trip segment. In some embodiments of the disclosed method one or more of the population characteristics correspond to one or more of the following driving conditions: driver identity, driver age, geographic location, source of trip data, vehicle speed, vehicle weight, vehicle type, time of day, traffic conditions, weather, topography, population density, and cultural norms.

In some embodiments of the disclosed method, the trip features occurring within the first trip segment are used to adjust the population feature values of one or more of the associated populations. In some embodiments of the disclosed method, the relative segment scores for the first segment are determined prior to adjusting the population feature values of the one or more associated populations. In some embodiments, the method is repeated for a plurality of driving trips. Each of the plurality of driving trips includes at least one trip segment associated with the one or more populations. In some embodiments of the disclose method, the trip data for said trip segments includes one or more driving conditions not included in the population characteristics of the one or more associated populations. In some embodiments, a new population is created after the method is repeated a desired number of times. In some embodiments, the population characteristics for the new population comprise the population characteristics of the one or more associated populations and the one or more driving conditions not included in the one or more associated populations.

In some embodiments of the disclosed method, one or more of the relative segment scores correspond to one or more of the following scoring metrics: aggression, distraction, eco, and overall performance.

In some embodiments of the disclosed method, the relative segment scores are used to calculate one or more scaled segment scores. In some embodiments, the one or more scaled segment scores indicate a normalized distribution of the relative segment score. In some embodiments of the disclosed method, the trip data is further processed to calculate scaled segment scores for each trip segment of the driving trip. In some embodiments, a trip score is calculated by weighting and aggregating the scaled segment scores. In some embodiments, a plurality of trip segments from a plurality of driving trips are processed as one trip segment, each of the plurality of trip segments being associated with one or more of the same populations and one or more of the same driving conditions. In some embodiments, a driver score is calculated by calculated by weighting and aggregating the scaled segment scores.

In some embodiments, the one or more of the event features correspond to one or more of the following events: acceleration, brake, turn, jerk, swerve, speeding, phone movement, and crash. In some embodiments, the one or more event feature thresholds are multi-variable event feature thresholds, each multi-variable event feature threshold comprising a function of a plurality of event feature thresholds.

In some embodiments, the trip data associated with the first trip segment is processed using event feature thresholds associated with the one or more associated populations. In some embodiments, one or more of the behavior features correspond to one or more of the following behaviors: acceleration, braking, turning, jerk, swerve, and speeding. In some embodiments, one or more of the behavior feature values is calculated using one or more of the following calculation methods: number of data samples, sum of data sample values, sum of the squares of the data sample values, and variance of the data sample values.

In some embodiments of the disclosed method, the motion data is collected by a phone, and wherein the behavior features indicate the duration of the trip segment in which there was phone movement relative to the vehicle movement.

In another aspect a non-transitory computer readable medium for storing processor-readable instructions are disclose. The instructions are configured to cause a processor to obtain trip data associated with one or more driving trips. The instructions further separate the trip data into one or more trip segments. Each trip segment is associated with one or more populations of a plurality of populations. Each population is associated with one or more population characteristics and one or more population features. The instructions process the trip data of a first trip segment to identify one or more trip features occurring within the first trip segment. The trip features comprise one or more of the following: event features and behavior features. Each event feature indicates an instance in which the processed trip data exceeds one or more event feature thresholds. Each behavior feature measures a driving condition. In some embodiments the driving condition can be vehicle movement over the duration of the first trip segment. In some embodiments, the driving condition can comprise measuring movement of a driver's head, facial features, or extremities. In some embodiments, the driving condition can include handling of a driver's phone. In some embodiments, the driving condition can be the presence or lack thereof of passengers, or the presence of noise (e.g., music or conversation). The instructions determine one or more relative segment scores for the first trip segment. Each relative segment score indicates a comparison between one or more trip features of the first trip segment and one or more population features of the one or more populations.

The following detailed description together with the accompanying drawings will provide a better understanding of the nature and advantages of the present disclosure.

BRIEF DESCRIPTION OF THE DRAWINGS

Aspects of the disclosure are illustrated by way of example. In the accompanying figures, like reference numbers indicate similar elements. The figures are briefly described below:

FIG. 5 is an example table of scaling factor values for various confidence intervals.

FIG. 13 illustrates score detail web page for an exemplary user interface for the technique for relative driver scoring using contextual analytics.

FIG. 14 illustrates a driver detail web page for an exemplary user interface for the technique for relative driver scoring using contextual analytics.

SUMMARY OF THE INVENTION

Figure 1:
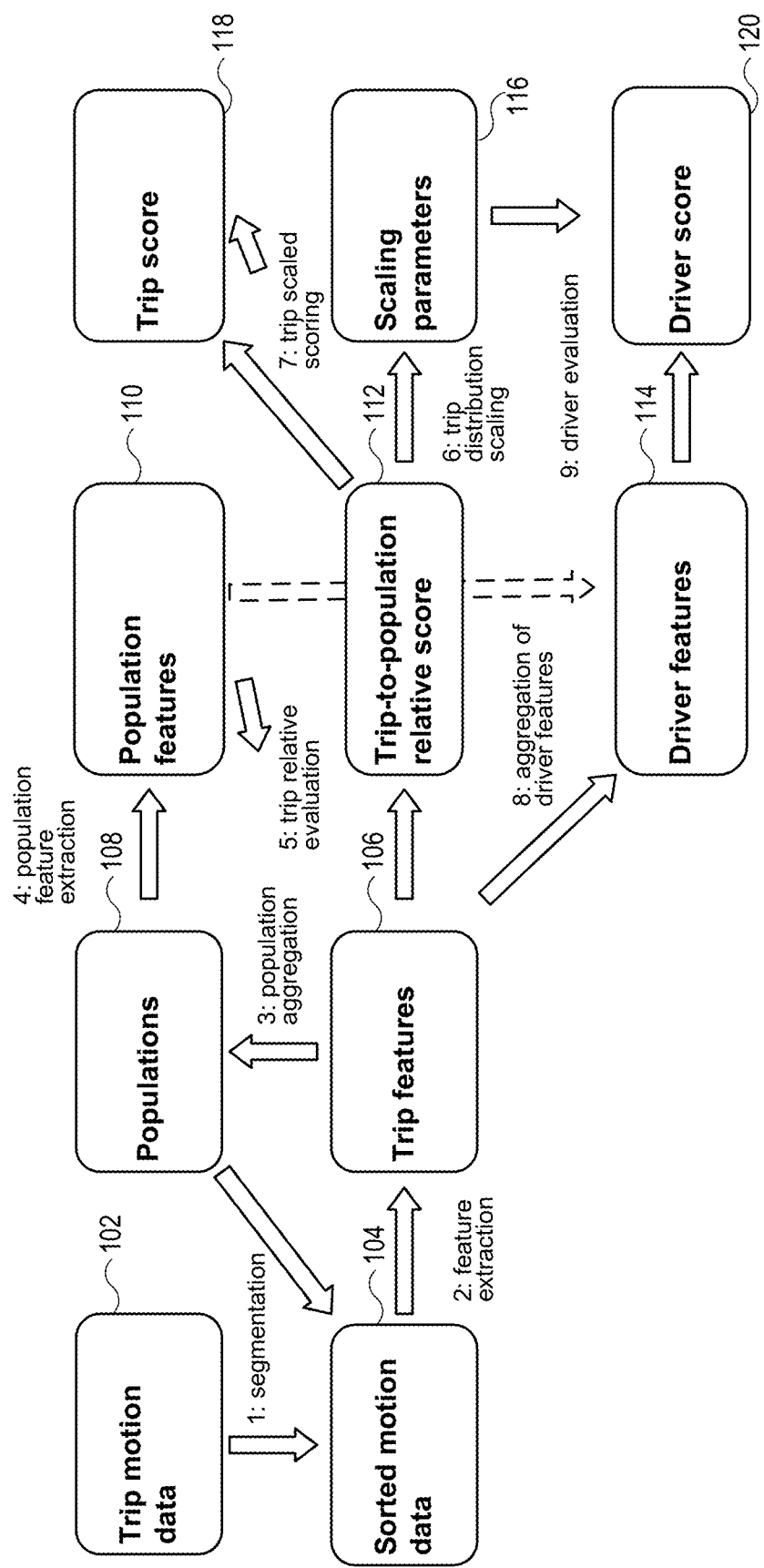
FIG. 1 illustrates an exemplary diagram of a high level system process.

A system to provide contextual analysis around driving behavior and driver scoring is described. The driving data to be assessed is provided in one or more scorable formats that represent the movements of a vehicle while driving. Additionally, contextual information about a vehicle trip is either provided or derived that includes but not limited to vehicle weight/type, time of day, traffic conditions, weather, topography, population density, and/or cultural norms. The system incorporates the contextual variables into the analysis in order to assess a driver's behavior relative to other drivers experiencing the same conditions. That is, the system is used to rank and compare drivers among other drivers while also to rank and compare groups of drivers, populations, or arbitrary collections of drives amongst each other.

The method is to provide relative measures of how well a driver performs compared to his/her peers. This requires little a priori modeling of good driving behavior and is robust to the many variables and ever changing conditions that a driver may operate under. In addition, the relative performance of a group of drivers to any other group can be used to assess driving behavior associated with different variables to better understand driving behavior as a whole. The key is to identify a driver's peers so that a relative comparison can appropriately be made.

Relative scoring of drivers to other drivers (or groups of drivers to other groups) can be used for a variety of purposes. For example, understanding how well a driver performs within a set of drivers can be used by auto insurers to provide discounts on auto insurance to the better drivers or higher rates to those exhibiting poor driving behavior. This type of scoring can be used to identify which conditions or driving variables (e.g., time of day, intersection types, road geometry, etc.) increase the risk of driving-behavior related accidents so that governments and institutions can better devote resources to improve safety conditions or emergency responder times. The system can be used as a coaching tool for drivers by targeting specific areas in which a driver performs below average relative to his/her peers, and since it is a relative measurement (i.e., a driver's behavior may improve but not as well as the overall group), it continually improves the driving behavior of the overall population. Additional applications include distinguishing whether someone is a driver or passenger within a vehicle, identifying the driver of a vehicle, and detecting vehicle type (e.g., detecting whether a known driver is on a motorcycle or in a car). These applications can be used to adjust auto insurance rates and to evaluate auto insurance claims.

There are also several applications relevant to user experience and recent advances in the auto industry. As more and more users participate in rideshare applications (e.g., Uber, Lyft, etc.), this system can be used to match a driver's style to that of the passenger for a better user experience. Similarly, this system can be used to better train autonomous driving systems to make passengers more comfortable riding in a self-driving car. It may also be used for driver-to-vehicle matching. That is, for consumers looking to purchase or rent a vehicle, knowledge of the driver's tendencies can assist in identifying vehicle classes, makes, models, etc. that the driver will more likely prefer.

The system is described here under the context of analyzing driving behavior. However, the system can be extended to analyze performance during any type of motion. Some example applications for other motion types include the performance of drones and the effects of their environment on performance, the safety assessment and maintenance monitoring of public transportation modes (e.g., trains and subways), and the evaluation and coaching of human movement for improved athletic performance.

This disclosure focuses on understanding and assessing driving behavior, a technology field not limited to computer technology. The present disclosure details technical improvements in the insurance industry, road infrastructure, driver coaching, driver/vehicle detection and identification, driver-to-passenger matching for rideshare systems, and driver-to-vehicle matching for autonomous systems. All of these applications are in fields other than computers.

In additions to these applications, the disclosed techniques provide significant improvements to the fields of fleet and vendor management as well as predictive vehicle diagnostics. Through machine learning the system identifies and distinguishes driving variables over time, and the system is thus able to eliminate the biases these conditions present in order to better evaluate a driver's abilities and habits compared to other drivers that may experience different conditions. This level of contextual awareness enables fair and consistent driver evaluation that reduces the cost of fuel consumption and vehicle maintenance. The disclosed system evaluates a driver's behavior (i.e., what is within a driver's control) while eliminating the biases caused by external factors (i.e., populations 108). Fuel and vehicle maintenance costs are then reduced by targeting a driver's decisions and coaching that driver to alter behavior towards a more fuel-efficient style (e.g., by reducing the amount of harsh accelerating) or a style that reduces the need for vehicle repairs (e.g., less severe braking or less harsh turning to improve the lifetime of brake pads and tires, respectively). Furthermore, by understanding the characteristics of the populations 108, fleets can make better decisions on how to route their drivers. For example, is it better to drive through a city with traffic or drive an extra 20-50 miles around the city where traffic is lighter? Typically, the expected time is the major factor in this decision, but more relevant to fleets as well as individual drivers is the expected cost associated with each decision. By understanding fuel usage patterns and vehicle wear for the different populations 108, a more informed decision of which route to take can be made.

This type of analysis also applies to predictive vehicle diagnostics. Automobile components such as brakes, tires, etc. have well-modeled expected lifetimes. However, there is a variance around that expected lifetime influenced by driving behavior. By targeting a driver's behavior (or in some cases the characteristics of the populations 108), we can better predict whether a wearable component such as a tire is likely to last for example, 45,000 miles or 50,000 miles. This can be used to better alert drivers or fleet managers to have their vehicle(s) inspected at the appropriate times to reduce the occurrence of failures while driving as well as reduce the downtime of vehicles that cannot be operated.

Additionally, driver training is particularly time consuming in the field of fleet management. One of the most common complaints from drivers is that scoring does not adjust to the context in which he/she drives and hence evaluates them "out of context." Consider a fleet that has drivers covering mountain range areas as well as flat areas. The driver in the mountains will have very different data recorded (e.g., more heavy braking downhill and more severe turning) compared to the drivers operating over flat land with generally straighter roads. The recorded data is then biased by these different driving conditions and does not truly capture the actual driving ability of the driver. Without correcting for these biases, drivers feel they are being judged unfairly, leading to increased complaints, lack of driver "buy-in," and ineffective coaching feedback. The time consumption on the fleet manager side comes from complaints from drivers that feel they are being misjudged. This disclosure mediates these effects, saving the fleet manager a lot of time and improving the driving behavior and effects of driver training over time through better targeted driver feedback.

DETAILED DESCRIPTION

Certain embodiments of the present disclosure relate to techniques for devices, graphical user interfaces, and computer-readable medium for relative driver scoring using contextual analytics. In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

I. High Level System Description

The system is provided with data from individual drives, referred to here as trips, that may be from one or more drivers. Each individual trip is marked with one or more identifiers that allow multiple trips to be grouped together (e.g., by driver, vehicle, family, company, etc.). The trip data to be assessed is provided in one or more scorable formats, which generally belong to one of two categories: motion data or representative features. When motion data is provided, the representative features are derived from the data. Each trip consists of one or more segments in which the driving conditions are consistent within that segment but different in other segments. Examples of differences between segments include geographic area, vehicle class, speed limits, time of day, road type, etc. The driving conditions describing a trip segment are referred to here as a population 108, and the representative features of the trip are then derived for each trip segment in a process described as feature extraction.

The features from segments of multiple trips that exhibit common driving conditions are aggregated together to identify and describe the populations 108 that are relevant to analyzing current trips and drivers, and the representative features of each population 108 are determined using the aggregated segments across multiple trips and drivers. An individual trip is then evaluated by comparing (e.g., computing the ratio of) the features of the trip segments to the features of the populations 108 to which they belong. For each population 108, the distribution of all of the trip-to-population comparisons is used to derive population scaling parameters 116 that create a desired, easily interpretable distribution of trip-to-population scores. For a given trip, the scaling parameters 116 for each trip segment are used to determine a trip segment score from the trip-to-population comparison for that segment. The score for the entire trip is then determined by a weighted average of the trip segment scores, where each segment is weighted by the duration of that segment.

In a similar method, driver scores are derived by first aggregating the trip segment features across multiple trips belonging to the same driver. The aggregated driver features 114 are then compared to the relevant populations features, and an easily interpretable driver score is determined using the scaling parameters 116 for each population 108 and a weighted average among the scores for each aggregated segment. This high-level system overview is described in FIG. 1. A more detailed description of the system is described in the following sections. Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

The disclosure herein concerns understanding and assessing driving behavior. The techniques are disclosed herein.

II. Motion Data

Generally, trip data is provided to the system in the form of motion data 102. Motion data 102 provide a representation of the vehicle movements and may include all or a subset of the following fields: location, vehicle bearing, velocity, acceleration, and/or jerk (i.e., the time derivative of acceleration). In some embodiments the motion data 102 can be discrete. In some embodiments the motion data 102 can be a time-series representation of the vehicle movement. Any of the motion data fields that are not provided can be estimated using the other fields through either integration or differentiation as needed. The motion data 102 can be provided over a wide range of sampling rates, where a rate of 1-10 Hz is typical.

Location data is typically provided as geographical coordinates (i.e., latitude and longitude). Altitude may also be provided to indicate large elevation changes that may affect driving behavior. Vehicle bearing describes the direction the vehicle is pointed with respect to the ground, and in the case when acceleration is not provided, it may be used along with vehicle speed to estimate lateral (i.e., left/right) accelerations. Velocity is typically provided as the forward speed of the vehicle and may be used to estimate longitudinal (i.e., forward/backward) accelerations. Acceleration may be provided in up to three dimensions and is oriented with the vehicle. In particular, the horizontal (i.e., longitudinal and lateral) accelerations of the vehicle are of concern, while the vertical acceleration can often be ignored. Lastly, the vehicle jerk is provided in the same orientation as the vehicle acceleration, where the longitudinal and lateral jerk should either be provided or estimated using the other data.

III. Trip Segmentation

The driving conditions that are experienced as a trip occurs often change throughout the trip, and it is often necessary to analyze sections of a trip differently than other sections. The section of a trip that experiences the same driving conditions is referred to here as a trip segment, and the driving conditions that apply to that segment are referred to as a population 108.

When trip motion data is received, it is first separated into distinct trip segments based on the currently defined population characteristics. Over time as more data is collected and the system becomes more knowledgeable, the set of populations 108 may change and newer trips may be analyzed differently than older trips. However, at any given time trips that are input into the system are sorted based on the system's current set of populations 108. A trip segment does not need to be a continuous section of a trip (i.e., continuous in time). For example, the beginning and end of a trip may belong to the same trip segment, but the middle of the trip belongs to a separate segment. The segmentation of the trip motion data 102 results in sorted motion data 104. The process of sorting the trip motion data into separate population segments is referred to as segmentation, and an example of this process is illustrated in FIG. 2.

Figure 2:
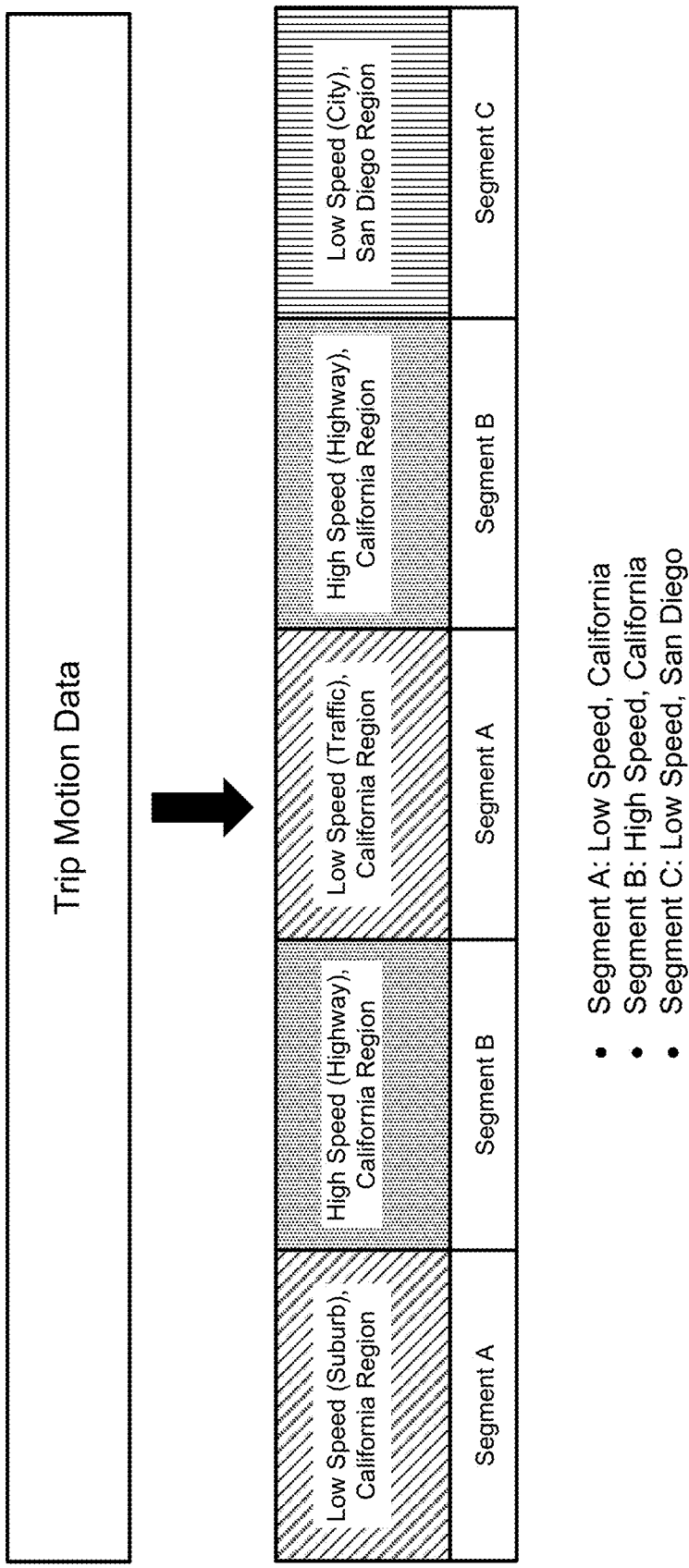
FIG. 2 shows an example of trip segmentation.

In the example in FIG. 2, a trip consists of 3 segments. In this example, the system has already defined that there is a distinction between low speed and high speed driving. Additionally, driving in San Diego specifically is considered to be different than driving within California in general. However, no distinction is made between low speed driving through a suburb and low speed driving while in traffic. In this example, the data collected at the beginning of the trip while in low speed suburban driving is grouped together with the data collected later while in low speed driving in traffic into one trip segment. Similarly, the two sections of high speed driving on a highway are grouped together into one segment even though they are divided in time by a section of driving in traffic. Finally, the section of low speed driving in San Diego is treated as its own segment because driving in San Diego is already considered by the system as different than driving in California but outside of San Diego.

The technique aggregates the sorted motion data 104 into various populations 108. Populations 108 are defined here as a set of driving conditions or characteristics that are common and unique among the trip motion data 102 that is grouped within that population 108. Once a population 108 is identified, the system then extracts population features 110 in a manner similar to the feature extraction process for trips. Population features 110 represent the average number of events for each event type normalized to a particular trip distance. Additional information on population features 110 can be found in section VII below.

After extraction of the trip features 106 and the population features 110 from the trip motion data 102, a relative evaluation can be conducted to determine a trip to population relative score 112. The relative score parameters provide a comparison of the trip motion data 102 for each trip segment to the typical driving behavior for the population to which the trip segment belongs. Additional information on calculating the population relative score 112 can be found in section IX.A. below.

The driver features 114 can be aggregated in the same manner as the population features 110, and include both event and behavior features. However, the driver features 114 can be aggregated over less trips as compared to a population in order to evaluate a driver's behavior. Additional information on driver features 114 can be found in section IX.E below.

The relative score parameters are not easily interpretable to provide context as to how well the driving performance for a given trip compares to that of the population 108. In order to provide this context, the distribution of the relative score parameters within each population 108 are used to create a scaled distribution that lies within a desired range and has certain statistical properties. The population scaling parameters 116 are periodically computed from the collected relative score parameters. A distinct set of scaling parameters 116 is computed for each relative score field (i.e., event fields: acceleration, braking, turning, jerk, swerve, speeding, and phone motion and behavior fields: acceleration, braking, turning, jerk, swerve, speeding, phone motion, aggression, distraction, eco, and total).

An individual trip can have several relative score parameters depending on the number of segments in the trip, and these parameters are aggregated to provide an overall trip score 118.

A driver's behavior over time, spanning many trips, that is particularly useful. In order to evaluate a particular driver, the trips for that driver must be aggregated into a set of driver features 114. These driver features 114 can then be used to provide an interpretable driver score 120 on the same scale as the trip scores 118. Additional information on driver scores 120 can be found in section IX.F below.

IV. Feature Extraction

In order to ultimately analyze and score the trip motion data 102, as shown in FIG. 1, the data from each segment is reduced to a set of trip features 106 that sufficiently describe the set of data. This process is referred to as feature extraction. There are two general categories of trip features used by the system: events and behavior. When trip motion data 102 is provided, the event and behavior features are determined for each trip segment within an individual trip. Alternatively, the trip features 106 may be provided to the system directly for trip scoring. The trip features 106 are ultimately used to characterize the performance over a single trip as well as to aggregate data and characterize performance by driver, population 108, or some other arbitrary grouping over multiple trips.

V. Event Features

Events are specific vehicle movements that are considered severe and should generally be avoided while driving. Extracting the events for a trip can provide a means to evaluate the performance of a driver during a trip. Using the trip motion data 102, events of the following types can be determined:

Acceleration—generated when a vehicle's speed increases at a significantly high rate with respect to time Brake—generated when a vehicle makes a sudden stop or its speed decreases at a significantly high rate with respect to time Turn—generated when a vehicle makes a sharp turn at too high a speed (i.e., the lateral movements of the vehicle are too harsh)

Jerk—generated when a vehicle's forward acceleration changes too quickly (i.e., the vehicle experiences a jerky forward motion)

Swerve—generated when a vehicle makes extreme swerving movements

Speeding—generated when a vehicle is moving faster than the posted speed limit (obtained from a lookup database)

Phone movement—in the case when the trip motion data 102 is collected by a phone, the movement of the device relative to the vehicle may indicate unsafe driving conditions (e.g., the driver is handling his/her phone while driving, sudden speed changes force a phone to fly off the seat, etc.)

Crash—generally a vehicle crash is detectable in the trip motion data 102, and may be used to indicate a driver's performance A requirement for extracting trip events is the definition of event thresholds. The system is able to create different event threshold definitions for each population and event type. That is, for each event type the trip motion data 102 from each trip segment is analyzed using the same event threshold, which may be different than the event threshold for any other trip segment within the same trip or trip segments from other trips that do not represent the same population. For example, what constitutes a hard brake or sharp turn for a population consisting of all large trucks may be different than a hard brake or sharp turn for a population of motorcycles. Similarly, what constitutes a hard brake or sharp turn may be different for a population representing high speed driving (e.g., at 65 mph) than it is for a population representing low speed driving (e.g., at 25 mph) and is different for a population representing clear, sunny weather than it is for a population representing rainy weather. This is a difficult process to predefine event thresholds for all of the possible combinations of driving conditions. However, a strength of this system is that it requires no a priori knowledge of what constitutes safe driving for each population. The system learns the event thresholds from the data itself, creating and continually updating event thresholds using the aggregated trip segment data for each population. This is described further in the section titled Populations.

Another unique aspect of event detection for the system is that within each population the event thresholds are a function of the other motion variables and not just the variable of interest. For example, a hard brake is often defined as any time the forward acceleration of the vehicle is below $-3.0$ m/s$^2$. An event definition such as this does not account for the lateral movement of the vehicle, and treats braking the same whether the vehicle is in the process of a sharp turn or is simply driving straight towards a traffic light. However, a vehicle decelerating quickly while also turning is more risky than a vehicle decelerating quickly while moving straight, and the threshold for a hard brake while turning is lower than while moving straight. The system described here accounts for the total motion of the vehicle while detecting events, which is illustrated in FIG. 3.

Figure 3:
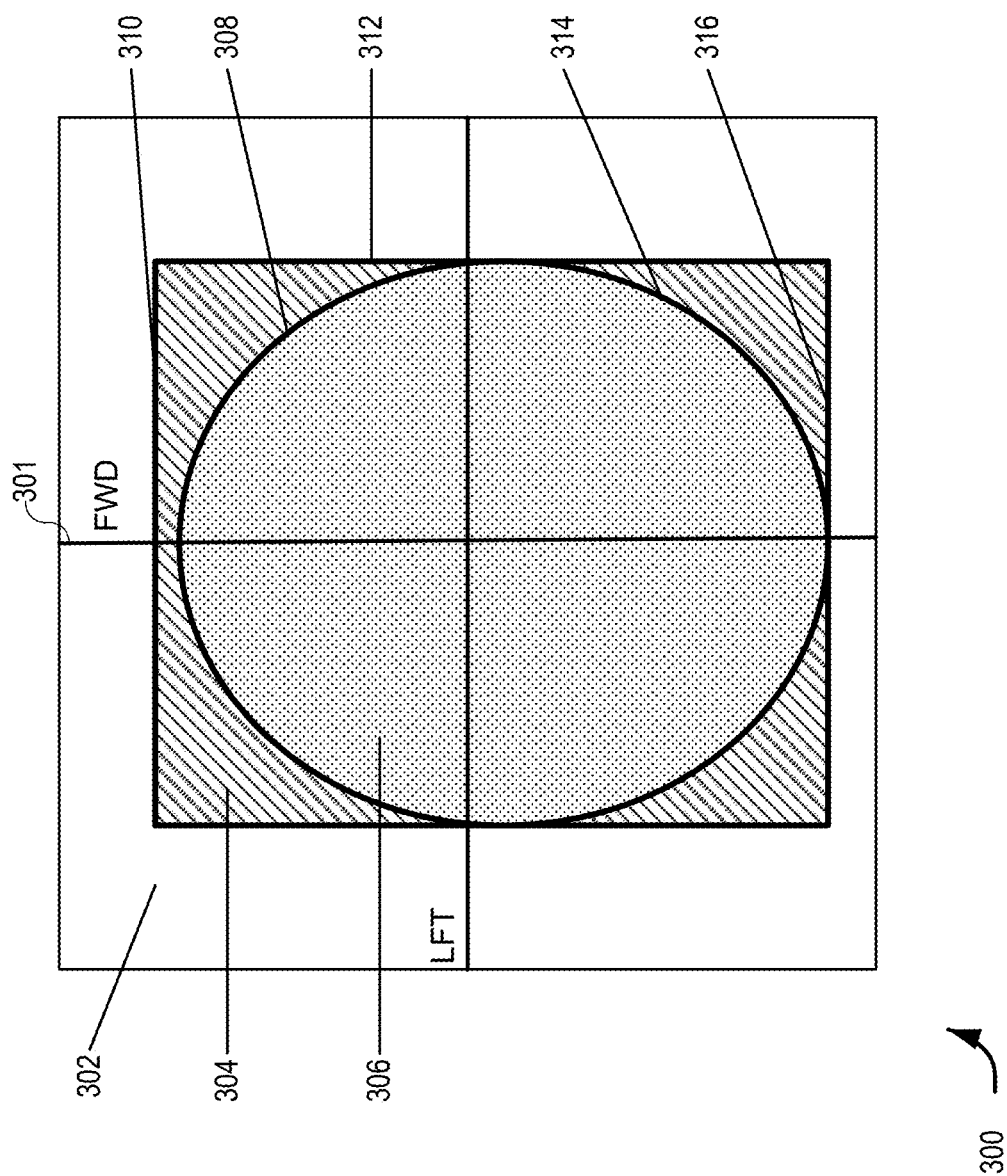
FIG. 3 depicts an exemplary multi-variable event threshold.

FIG. 3 depicts an exemplary graph of a multi-variable event threshold. Multiple variables can be depicted on the graph to illustrate various safe driving thresholds. The upper quadrants represent forward acceleration of a vehicle. The lower quadrants represent deceleration of a vehicle. The center vertical line 301 represents no lateral acceleration. To the left of the center vertical line 301, left lateral acceleration of the vehicle is depicted. To the right of the center vertical line, right lateral acceleration of the vehicle is depicted. For example, the unshaded area 302 represents the unsafe driving region for both threshold types. The safe driving region (constant thresholds) 304 is depicted and represents an unsafe driving region for variable thresholds. The safe driving region (both threshold types) 306 is illustrated inside the safe acceleration/turning variable threshold line 308. The safe acceleration constant threshold 310 is illustrated as the forward limit. The safe braking/turning variable threshold 314 is depicted in the lower quadrants representing deceleration. Finally, the safe braking/constant threshold 316 is illustrated by the limit line in the lower quadrant.

Therefore FIG. 3 illustrates different ways to define what constitutes a driving event. Typically constant thresholds are set for accelerating, braking, and turning separately. This case is shown by the solid square box in FIG. 3. With this type of threshold, the other movements of the vehicle are not accounted for, and actual unsafe driving events may be undetected. A multi-variable threshold is used by this system and considers the longitudinal and lateral movements of the vehicle simultaneously. The threshold for safe acceleration is a function of the forward and lateral accelerations of the vehicle. Similarly, safe braking is a function of the vehicle deceleration and lateral acceleration. Lastly, the turning threshold is defined using the lateral and forward acceleration when the vehicle is increasing speed or the lateral and reverse acceleration when the vehicle is decreasing speed. Any function can be used to evaluate the threshold in terms of the longitudinal and lateral acceleration. The example figure illustrates an elliptical threshold, where an event is generated if $$\frac{a_{lng}^2}{l_{lng}^2} + \frac{a_{lat}^2}{l_{lat}^2} > 1$$

Here alng and alat are the longitudinal and lateral accelerations of the vehicle and llng and llat are the maximum values of the longitudinal and lateral thresholds. The maximum values for the thresholds correspond to when all of the motion of the vehicle is focused in that direction. For instance the maximum braking threshold occurs when the vehicle is only decelerating and there is no lateral acceleration.

During the feature extraction process, the system identifies all of the events within each trip segment. Generally, each event is recorded and stored with the following information: start time, duration (e.g., the total time the trip motion data 102 was above the defined event threshold or the time to return to some other defined "safety" threshold since first crossing the event threshold), characteristic location (e.g., the location at the start of the event), characteristic speed (e.g., the speed at the start of the event), and severity. The event severity is a measure of how extreme the event was and can be defined in a variety of ways. For example for a braking event, the severity may be the maximum braking acceleration recorded during the event. Alternatively, the severity may be defined as the sum of the braking acceleration that is outside of the event threshold over the entire duration of the event.

The event features for a trip are a set of metrics that describe all of the events within that trip. One set of event features may be simply the number of events for each event type. However, more complex metrics can also be used. For instance, there can be multiple thresholds that are defined for different event types to distinguish between the importance of events. For example, three separate thresholds can be defined to distinguish hard, severe, and extreme brake events, and the number of events within each level for each event type can be used as the event features. Another example is to separate events between short and long events based on their duration and record the number of events. As an alternative to the number of events for any of the categories described, the event features may be recorded as an average of the event severities and optionally weighted by the event durations.

VI. Behavior Features

As opposed to event features, which capture specific occurrences of unsafe vehicle movements, behavior features describe the vehicle motion over each trip segment. The behavior features generally provide more insight into a driver's performance as they are more robust to noise in measurements or errors during the data collection process. Within each trip segment (i.e., the trip motion data 102 of the trip belonging to one population 108), the behavior features are determined for the following fields:

Acceleration—the longitudinal acceleration values that are greater than zero (i.e., vehicle speed is increasing)
Braking—the longitudinal acceleration values that are less than zero (i.e., vehicle speed is decreasing)
Turning—the lateral acceleration values
Jerk—the time derivative of longitudinal acceleration
Swerve—the time derivative of lateral acceleration
Speeding—the speed of the vehicle relative to the posted speed limit (obtained from a lookup database)
Phone movement—in the case when the trip motion data 102 is collected by a phone, the data that has been flagged indicating movement of the device relative to the vehicle For each field, with the exception of phone movement, the following behavior features are extracted and recorded:

$T0 = \Sigma \ x^0$: the number of data samples for that field
$T1 = \Sigma \ x^1$: the sum of the data sample values for that field
$T2 = \Sigma \ x^2$: the sum of the squares of the data sample values for that field
$var = (T0*T2 - T1^2)/(T0*(T0-1))$: the variance of the data sample values for that field In the equations above, x represents a data sample for that field, where each data sample represents the trip motion data 102 at a discrete point in time. For example, in the case of braking x is each of the longitudinal acceleration samples that are less than zero. The features T0, T1, T2 are used to aggregate data over multiple trips or trip segments and is described in later sections. In the case of phone movement, the behavior feature that is used is the ratio of the total duration in which there is phone movement to the total duration of the trip segment.

VII. Populations

The system evaluates individual trips, drivers, and groups of drivers by comparing their features to that of their peers. This provides relative measures of the performance compared to other trips with the same driving conditions and accounts for contextual variables that may influence driving behavior such as vehicle weight/type, time of day, traffic conditions, weather, topography, population density, cultural norms, etc. In order to achieve this, the system must identify relevant populations or sets of trip motion data 102 that can be grouped and classified together. Populations 108 are defined here as a set of driving conditions or characteristics that are common and unique among the trip motion data 102 that is grouped within that population 108. Once a population 108 is identified, the system then extracts features for the population 108 in a manner similar to the feature extraction process for trips.

A. Identification

The system starts off with a limited number of populations 108 based on some a priori modeling of driving behavior. This could be a single, global population 108 that does not distinguish between any variations in driving conditions at first. Another option is to initially separate data based on vehicle speed, for example, creating a low speed and high speed population with the cutoff speed at 20 m/s. The initial populations are used in the trip segmentation process to separate data from a given trip. Although driving performance in trips is likely influenced by more contextual variables, the trips are segmented based only on the populations 108 that are currently defined within the system. New populations are learned and created over time as more and more trips are collected, and new trips are then segmented using these new populations.

Upon input into the system, trips may be annotated with some contextual information that allows new populations to be generated over time. For example, the vehicle make and model or the vehicle class (e.g., sedan, SUV, etc.) may be supplied with the trip data in order to group trips made with the same type of vehicle. This can be an important factor in analyzing driving behavior as large commercial trucks move differently than small cars. Other contextual information can be inferred from the data itself. Location samples are often supplied with the trip data. This allows the geographic region, such as the country or city, to be identified. Additionally, factors such as elevation change or road type (i.e., highway v. city street) can be determined from the trip location data. When the trip time is also included, further information can be determined such as the local time of day, weather during the trip, traffic conditions, etc.

New variables that are used to distinguish between driving conditions and ultimately define new populations within the system can be identified in a variety of ways. One option is to manually identify a variable based on some anecdotal or empirical evidence. For example, one may pose a theory that weather conditions, specifically the distinction between whether or not it is raining, greatly influence driving behavior. Another option is to identify a variable or variables using the previously collected trip motion data 102 and trip segment features. For example, suppose the system contains two populations: high speed driving and low speed driving. However, within the high speed driving population, some trip segments show very similar features compared to other trip segments within this population. The system identifies this subgroup of segments that show high similarity and identifies that most of these segments occurred during rainy weather and very few of the segments outside of this subgroup occurred during rainy weather. The system then proposes a new driving condition variable that distinguishes between whether or not it was raining. In either case, whether the variable was introduced manually or was identified from the collected data, new trips will begin to be segmented based on this driving condition.

As more and more trips are collected that exhibit the driving condition for a newly identified variable, that set of data is used to describe the new population. The driving condition represented by this population can account for one additional variable or multiple driving variables, depending on what data is available. For example, if the system starts with a low speed and high speed population, these populations represent all vehicle types in all parts of the world. As more trip data is collected from sedans, a population may be created representing sedans at low speed. Similarly, as more data is collected within the United States, a population can be created representing low speed driving in the United States. Further, a population for sedans driving at low speed in the United States can be created. Moreover, the geographic regions can be made arbitrarily small, such as state-level (e.g., California), city-level (e.g., San Diego) or specific zip codes.

By generating populations 108 in this manner, the number of groups grows rapidly for every new dimension or variable that is considered. To handle this, populations 108 may be compared to each other in order to merge populations 108 that show common behaviors. For example, individual population groups can be created for every city in the world. However, many of those cities may exhibit similar behavioral patterns. Through clustering algorithms, populations 108 that are statistically equivalent can be merged, greatly reducing the number of populations 108 that need to be classified to a more manageable number. As was the case in creating the original populations, the reduction and merging of populations 108 is also learned from the data itself.

Due to the exponentially growing number of combinations that exist by introducing a new variable (or dimension), there is a need for merging populations 108. For example, if only one variable is considered in which there are 2 options, then there are 2 population groups (e.g., high speed v. low speed, light vehicle v. heavy vehicle, raining v. not raining). If a second variable is considered, there are now 4 possible populations (e.g., high speed and light vehicle, high speed and heavy vehicle, low speed and light vehicle, low speed and heavy vehicle), and if 3 variables are considered there are up to 8 populations (e.g., high speed, light vehicle, raining; high speed, light vehicle, not raining; high speed, heavy vehicle, raining; high speed, heavy vehicle, not raining; low speed, light vehicle, raining; low speed, light vehicle, not raining; low speed, heavy vehicle, raining; low speed, heavy vehicle, not raining). Thus, if there are 10 dimensions considered, each with 2 options (e.g., high v. low speed, heavy v. light vehicle, rainy v. clear weather, day v. night, rush hour v. off peak, hilly v. flat roads, urban v. suburban, winter v. summer, experienced v. inexperienced driver, short v. long trip duration), then there are up to $2^{10}=1024$ populations! This assumes that each dimension has only 2 options, but each dimension can have an arbitrarily large number of options (e.g., instead of raining v. not raining, consider raining, snowing, foggy, sunny, cloudy, etc.). If that one dimension grows from 2 options to 5 options, there are now $5 \times 2^9 = 2560$ populations. Further, if the 10 dimensions each grew by one additional option, from 2 to 3, the number of populations grows from 1024 to $3^{10}=59,049$ populations, an increase of over 57 times compared to having 2 options. This highlights that the number of population groups can grow very quickly if all options are considered. However, this also implies that a lot of data is required to consider all options. For statistical accuracy, a new population requires ~1000 trip segments distributed over ~100 drivers. So, to describe the populations for representing 2 options of one variable, ~2000 trip segments are needed. To describe 4 populations (2 options each for 2 variables as described earlier), ~4000 trip segments are required. Lastly, to describe all of the possible 1024 population groups in the 10 variable example mentioned earlier, at least 1,024,000 recorded trip segments are needed.

By intelligently merging populations, this requirement on the amount of data can be dropped significantly. Every pair of populations that can be merged reduces the number of required trip segments for creating new populations by 2000. In the example of 4 population groups split among 2 variables (high v. low speed and heavy v. light vehicle), assume that the high speed and heavy vehicle population is statistically similar to the low speed and light vehicle population. These population groups can then be merged, resulting in 3 remaining populations. Then, in order to split along a new dimension such as raining v. not raining, there are now only 6 (6000 trip segments minimum) population groups to consider instead of 8 (8000 trip segments minimum). As the system grows to 10 variables, instead of 1024 populations to consider, there are now only 768 population groups, requiring 256,000 less trip segments to fully describe. Clustering algorithms comprise one method to merge populations, in which the population characteristic features. Examples of well-known clustering algorithms are K-Means clustering, Mean-Shift clustering, density-based spatial clustering with noise (DBSCAN), and expectation-maximization (EM) clustering.

As more contextual variables are introduced into the system to distinguish among populations, variable ordering is used to determine the hierarchy among populations, which dictates the order in which trip motion data 102 is segmented. All populations (except for the single "global" population) have a parent population, and each population may have multiple children. For example, if the contextual variables considered by the system include low speed v. high speed, region (i.e., country, state/province, city), and vehicle class, incoming trips can be segmented in a variety of orders. One option would be to separate by speed first, then vehicle, and lastly region. In this ordering, a "low speed, all vehicles, all regions" population can exist as well as a "low speed, sedans, all regions" population, but a "all speeds, sedans, all regions" population is not allowed because the trip motion data 102 must be segmented by speed before segmenting by vehicle. Thus, identifying data based on the second variable (sedan) cannot happen before grouping the data based on the first variable (low speed or high speed). However, if the variable ordering was instead vehicle, speed, then region, a "sedans, all speeds, all regions" is allowed but a "all vehicles, low speed, all regions" is not.

Figure 4:
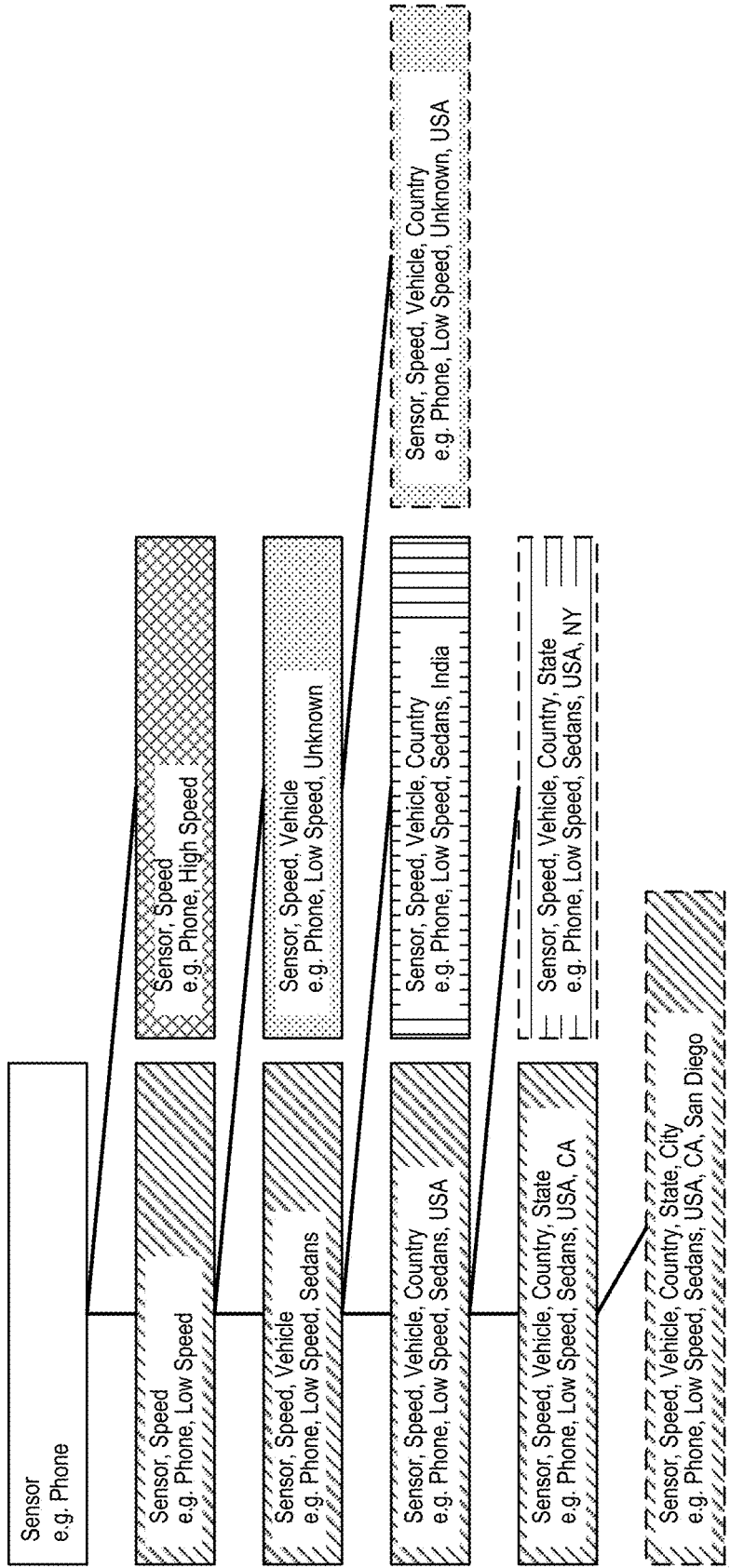
FIG. 4 shows an example tree structure for population generation.
Figure 6:
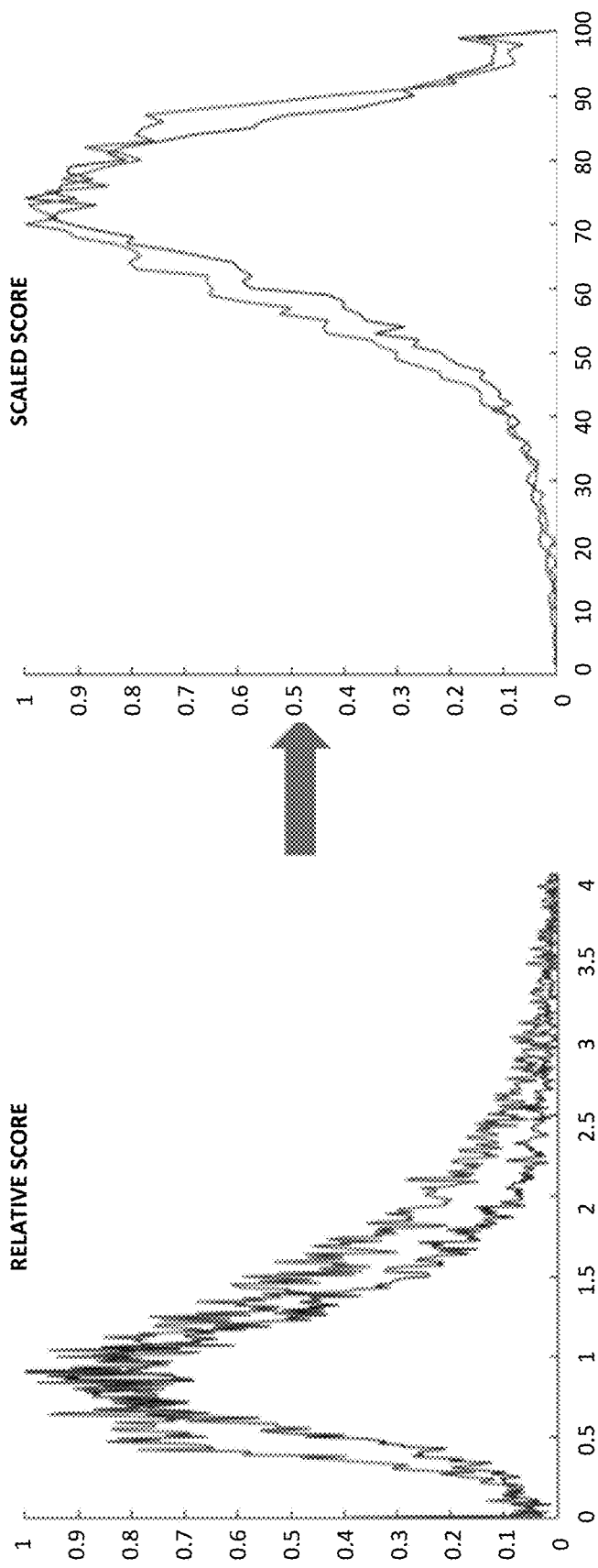
FIG. 6 is an example of the scaling of relative score parameter distribution.

This example is illustrated in FIG. 4, where the sensor type used to collect the trip motion data 102 is also included as a contextual variable. In FIG. 4, the variable ordering is: 1) sensor type, 2) speed category, 3) vehicle class, 4) country, 5) state/province, and 6) city. FIG. 4 also illustrates that "unknown" is an acceptable value for any of the variables. Thus as is shown in FIG. 4, it is valid to have a population for data collected by phones at low speed in the United States where the vehicle type is unknown. FIG. 4 also shows how trips are segmented based on the current system populations. The populations with a dashed line border represent "future" populations in which the system currently does not have enough data to accurately represent that population. In this case, the trip is still segmented using the full set of contextual variables in order to update the population features 110, however, for the purpose of trip evaluation (described in a later section) the trip is segmented using the tree structure to group the trip motion data 102 corresponding to "future" populations into the parent population's segment. In the example, low speed data of a sedan collected from a phone in San Diego is segmented into the "phone, low speed, sedans, USA, CA" population for the purposes of trip evaluation until the "phone, low speed, sedans, USA, CA, San Diego" population is represented by enough trip segments. Similarly, low speed data of a sedan collected from a phone in New York state is segmented into the "phone, low speed, sedans, USA" population. Generally, a population is no longer considered a "future" population if it contains data collected from the order of 1000 trip segments spread over the order of 100 drivers.

The concept of variable ordering refers to the order in which variables are considered. For example, is it better to first split populations by driving speed and then vehicle weight, or vehicle weight first and then driving speed? Depending on the order chosen and the number of options for each dimension, the variable ordering can have a significant impact on the amount of data needed and can hide the impact of some driving variables. For example, if the year of a vehicle is used to create populations first and then high speed v. low speed is considered within each of those populations, it requires significantly more trip segments to derive that vehicle speed is an important driving characteristic, whereas there is perhaps not a significant difference among the different years of vehicle. By merging populations, the system limits the effects of variable ordering. In the previous example, the vehicle years could be merged into a smaller group of populations, such as new v. old vehicles, which significantly reduces the number of populations and thus reduces the amount of trip segments required to analyze the effects of vehicle speed. In short, merging populations enables the system to ignore driving variables that do not significantly influence behavior, thus making the system faster and more efficient in identifying the key variables that do influence behavior, creating populations that represent these sets of key variables, and removing the biases associated with those populations.

To provide an additional example, envision two populations: one that is annotated as (uphill, support road, in snow) and a second population that is described as (flat, support road, rain). Assuming both populations have similar statistics, the system can merge these populations. This results in one population that is described as: (uphill, support road, in snow) or (flat, support road, rain). Any trip segment that is described by either population description now falls into this new population. Thus, the driving behavior of people driving (uphill, support road, in snow) and the driving behavior of people driving (flat, support road, rain) are compared with each other and evaluated together. The result is that the two populations will be set inactive and the new population will be active. However, as new data is collected, all three populations are updated in the event that the two diverge statistically.

To summarize, as more data is captured by the system and a population is getting to a size to be split, the system can create new populations by with a set of more precise variables (annotations) that describes the population. For example, the system did not previously distinguish between rain and heavy rain. The system can split an existing population based on that distinction. Further, if large trucks below 10 mph generate similar statistics as medium trucks traveling faster than 25 mph that drive in rain uphill. If the system has previously determined that these populations are similar, it will have merged the populations. However, as more data comes in the system may evolve the system's learning and split the populations again.

VIII. Population Features

In order to evaluate trip segments relative to their population, defining features for the population 108 need to be determined. These features are the same as the trip segment features and include both event and behavior features. However, the population features 110 are aggregated over multiple trips and are derived from the trip features 106.

For events, the population features 110 represent the average number of events for each event type normalized to a particular trip distance, such as 10 miles. This is determined by taking the event counts from each trip and scaling them by the ratio of 10 miles to the actual trip distance, resulting in the normalized event count. Then, the population event feature is the average of all of the normalized event counts. There are multiple options for computing this average normalized event count. One option is to compute the average over all trips within that population for all time. As more trips are added to the population, however, this type of averaging will lead to very slow population changes. Another option is to weight recent trips more heavily than past trips. This can be done using a running cliff, where only the last N trips are used to generate the population features 110. Alternatively, the average normalized event count can be updated with each new trip using the formula $$e_{avg}(k) = we_k + (1-w)e_{avg}(k-1)$$

where eavg(k) is the average normalized event count over k trips, ek is the normalized event count for the kth trip, and w is a weighting factor for each new trip. A typical value for w in generating population features 110 falls in the range 0.0001-0.001.

For population behavior features, an average of the parameters T0, T1, and T2 over the trips for each behavior field is used to compute the variance of the data for that behavior field. The average of T0, T1, and T2 can be computed using the same principles as that for the average normalized event count, where the average can include all or only the last N trips. Similar to the average normalized event count, a weighted average can be computed for each parameter using the formula $$Tj_{avg}(k) = wTj_k + (1-w)Tj_{avg}(k-1)$$

where Tjavg(k) for j=0, 1, 2 is the average parameter value over k trips, Tjk is the parameter value from the kth trip, and w is the weighting factor for each new trip. As with the events, a typical value for w in generating population behavior features is in the range 0.0001-0.001. The variance for the behavior field, varp, is then computed in the same manner as for trips $$\text{var}_p = (T0_{avg} * T2_{avg} - T1_{avg}^2) / (T0_{avg} * (T0_{avg} - 1))$$

Another set of features for the population that needs to be determined is the limiting thresholds for each event type. These thresholds can be determined using the population behavior variance for the corresponding behavior field (e.g., the braking event threshold is computed using the population braking behavior variance). The threshold is then found using the M % confidence interval for the aggregated population data defined as $$l = \sqrt{h * \lambda(M) * \text{var}_p}$$

where l is the event threshold limit, varp is the behavior variance of the aggregated data, h is a half-normal adjustment factor, and λ is the scaling factor corresponding confidence M. The half-normal adjustment factor is used for the acceleration and braking event thresholds and is defined as h=π/(π~2) (i.e., for the turning event threshold, h=1). Values of the scaling factor, λ, for different confidence values, M, is given in FIG. 5.

IX. Trip Evaluation

With the trip features 106 and the population features 110 characterized, an individual trip is evaluated by comparing each of the trip segments to the population in which it belongs. As described earlier, for the purpose of trip evaluation the trip is segmented using the population tree structure to group trip motion data 102 from underrepresented populations into the parent population's segment, where a well-represented population contains data from the order of 1000 trip segments spread over the order of 100 drivers. The result obtained during this process is a relative score parameter for each trip segment. An individual trip can have several relative score parameters depending on the number of segments in the trip, and these parameters are aggregated to provide an overall trip score. However, to make the results easy to interpret, before being aggregated the score parameters are individually scaled based on the score parameter distribution within each population.

A. Relative Score Parameters

The relative score parameters provide a comparison of the trip motion data 102 for each trip segment to the typical driving behavior for the population to which the trip segment belongs. A simple method for making this comparison is taking the ratio of the trip segment features to the population features 110 for each feature type. For event features, this ratio describes how many unsafe driving events occurred during the trip compared to what is typical for the driving conditions of that population. For behavior features, the ratio describes the overall energy in the trip motion data 102 compared to what is typical for that population 108. Each trip segment then has a set of event relative score parameters and behavior relative score parameters that are used to evaluate that segment compared to previous data collected for that population 108.

It is useful to define additional relative scoring fields that are derived from the event and behavior feature fields to provide more context to the trip evaluation. Derived relative scoring parameters are determined for the following fields:

Aggression—a measure of how aggressive the driving behavior was (e.g., consistently speeding, accelerating quickly, etc.)

Distraction—a measure of the driver's level of distraction (e.g., drifting from lanes, slow responses to traffic patterns, consistently handling a mobile device, etc.)

Eco—a measure of the driver's fuel efficiency (e.g., not wasting energy while speeding up or slowing down, maintaining consistent speeds, etc.)

Overall—a measure of the overall performance

The aggression score evaluates a driver's choices, where a better score reflects calm, courteous driving. The aggression field is derived as a weighted average among the acceleration, braking, turning, and speeding fields. Conversely, the distraction field is derived from the jerk, swerve, and phone motion fields and characterizes a driver's attentiveness. The eco score represents how efficiently a driver uses the vehicle's energy. This field is derived from the acceleration, braking, speeding, and jerk fields (i.e., the fields associated with the vehicle's forward motion). Lastly, the overall score is derived from all of the feature fields and represents the overall performance while driving.

These derived fields are computed for separately for the event and behavior features. Additionally, a fused score is derived for each field by averaging the event and behavior scores. Generally, the fused score is computed as a weighted average with the behavior score weighted more heavily than the event score. For example, the fused braking score is a weighted average between the event braking and behavior braking scores, and the fused eco score is a weighted average between the event eco and behavior eco scores. The fused scores, in particular the fused overall, aggression, distraction, and eco scores, are ultimately used to provide a general evaluation of the driving performance during a trip. Conversely, the value of providing scores within the independent fields represented by the event and behavior features is that this offers the ability to identify precise areas of improvement for a driver's ability.

B. Scaled Score Parameters

The relative score parameters are not easily interpretable to provide context as to how well the driving performance for a given trip compares to that of the population. In order to provide this context, the distribution of the relative score parameters within each population are used to create a scaled distribution that lies within a desired range and has certain statistical properties. For example, when the ratio of trip features 106 to population features 110 is used as a relative score parameter, the result can take on a value of 0 to an arbitrarily high number, depending on the trip and population feature values. It is perhaps easier to interpret the results if they are placed on a 0-100 scale, however, with 100 indicating great performance and 0 indicating poor performance. Additionally, it may be desired that an average performance be given a value of 70 rather than 50 on the 0-100 scale.

Using the distribution of relative score parameters, this scaled distribution can be achieved. For each relative score parameter type (i.e., event and behavior relative scores for each feature field), the distribution of all values within a population is denoted U. It can be assumed that given enough values, U will approximately take on a lognormal distribution. This implies that the distribution $X=\ln(U)$ is approximately the normal distribution, with mean $\mu x$ and standard deviation $\sigma x$. From this distribution, the population scaling parameters 116 {umin, umax, a, b} can be computed as $$u_{min}=\exp(\mu_x-3.402*\sigma_x)$$

$$u_{max}=\exp(\mu_x+4.641*\sigma_x)$$

$$a=0.85/\sigma_x$$

$$b=-1.0-a*\mu_x$$

The population scaling parameters 116 are periodically computed from the collected relative score parameters. A distinct set of scaling parameters 116 is computed for each relative score field (i.e., event fields: acceleration, braking, turning, jerk, swerve, speeding, and phone motion and behavior fields: acceleration, braking, turning, jerk, swerve, speeding, phone motion, aggression, distraction, eco, and total). The scaling parameters 116 computed using the above equations result in a desired scaled distribution known as a logit distribution on a 0-100 scale with average score of 70. The equations above can be tuned to provide scores over a different range and/or with different average score value.

To determine the scaled score parameters for a trip segment, the population scaling parameters 116 are applied to the relative score parameters. For a relative score parameter, u, and population scaling parameters 116, {umin, umax, a, b}, if u<umin then u is set to umin, and if u>umax then u is set to umax. This guarantees that the scaled score will lie in the desired scoring range. The scaled score parameter, s, is then given by the formula $$s=100-100/(1+\exp(-a*\ln(u)-b))$$

An example of this scaling process is illustrated in FIG. 5. The distribution of relative scoring parameters is shown on the left side of FIG. 5, and the resulting scaled scoring parameters is shown on the right. FIG. 5 shows two relative score distributions that have been scaled. These could be distributions of the same field (e.g., braking) for separate populations or two different fields (e.g., acceleration and braking) within the same population.

C. Trip Score

The trip score 118 is ultimately determined using the scaled scores for each trip segment. The trip score 118 is a weighted average of the segment scores, where each segment is weighted by the percentage of data it provides to the entire trip. In other words, the trip score 118, $s_t$, is computed as $$s_t = \frac{1}{t}\sum_i t_i s_i$$

where t is the total trip duration, $t_i$ is the duration of each segment i, and $s_i$ is the segment score. For example, in FIG. 2 the trip was separated into 3 segments: A (low speed, California), B (high speed, California), and C (low speed, San Diego). As the figure is illustrated, segment A makes up 40% of the trip, segment B 40%, and segment C 20%. In this case, the trip score is computed from the segment scaled scores as $s_t=0.4s_A+0.4s_B+0.2s_C$.

D. Driver Evaluation

Trip evaluation is useful for providing insight into the driving patterns under specific driving conditions (i.e., populations) and allows for the characterization of "typical" driving behavior under those conditions. Additionally, trip evaluation allows for a driver's performance over a specific instance to be evaluated relative to his/her overall behavior. However, it is the driver's behavior over time, spanning many trips, that is particularly useful. In order to evaluate a particular driver, the trips for that driver must be aggregated into a set of driver features 114. These driver features 114 can then be used to provide an interpretable driver score 120 on the same scale as the trip scores 118. Additionally, a "driver" may also be an arbitrary collection of drives that share some similar characteristic (e.g., a group of many drivers belonging to a particular fleet or all drives of a driver at night) and can be used to evaluate the overall performance over those drives.

E. Driver Features

The driver features 114 are aggregated in the same manner as the population features 110, described earlier, and include both event and behavior features. However, the driver features 114 can be aggregated over less trips as compared to a population in order to evaluate a driver's behavior. While population data is aggregated on the order of 1000-10000 trips, driver data only needs on the order of 50-100 trips. Additionally, the driver features 114 are separated and computed independently by population. That is, the driver data is aggregated over trip segments that belong to the same population. For example, a driver that commutes around San Diego primarily but makes occasional trips to Los Angeles will likely have data from multiple populations. Most of the driver's data may be in the "phone, low speed, sedans, USA, CA, San Diego" and "phone, high speed, sedans, USA, CA, San Diego", but the driver may have additional data in the "phone, high speed, sedans, USA, CA", "phone, low speed, sedans, USA, CA, Los Angeles", and "phone, high speed, sedans, USA, CA, Los Angeles" populations among others. A set of driver features 114 is determined for each of these populations to which the driver has data over his/her last N trips, where N is typically 50-100. These sets of data are referred to as driver segments.

The driver event features provide the average number of events for each event type normalized to a particular trip distance, such as 10 miles. As with the population event features, the driver average normalized event count can be updated with each new trip using the formula $$e_d(k) = we_k + (1-w)e_d(k-1)$$

where $e_d(k)$ is the average normalized event count over k trips, ek is the normalized event count for the kth trip, and w is a weighting factor for each new trip. A typical value for w in generating driver features 114 falls in the range 0.1-0.01.

The driver behavior features are computed in a similar manner, where an average of the parameters T0, T1, and T2 over the trips for each behavior field is used to compute the variance of the data for that behavior field. The average of T0, T1, and T2 can be computed using the formula $$Tj_d(k) = wTj_k + (1-w)Tj_d(k-1)$$

where $Tj_d(k)$ for j=0, 1, 2 is the average parameter value over k trips, $Tj_k$ is the parameter value from the kth trip, and w is the weighting factor for each new trip. As with the events, a typical value for w in generating population behavior features is in the range 0.1-0.01. The variance for the behavior field, yard, is then computed in the same manner as for trips $$var_d = (T0_d * T2_d - T1_d^2)/(T0_d * (T0_d - 1))$$

F. Driver Score

The driver score 120 is computed using the same principles as for an individual trip score 118. However, the scaling parameters 116 used to determine the driver score 120 are the parameters derived from the trip score distribution. That is, for each population, a new set of scaling parameters 116 is not computed from the relative driver score distribution.

The driver relative score parameters are computed by taking the ratio of the driver features 114 to the population features 110 for each feature type. For event features, this ratio describes the typical number of unsafe driving events experienced during a trip by this driver compared to what is typical for the driving conditions of that population. For behavior features, the ratio describes the overall energy in the driver's data compared to what is typical for that population. Additionally, relative scores are determined for aggression, distraction, eco, and overall in the same manner as is done for trip evaluation. Finally, a fused score is computed for each field by averaging the event and behavior scores. Each driver segment then has a set of event, behavior, and fused relative score parameters that are used to evaluate that segment compared to data collected for that population across multiple drivers.

The driver relative score parameters for each driver segment are then scaled using the population scaling parameters 116 computed from the trip relative score parameters. For a driver relative score parameter, u, and population scaling parameters 116, {umin, umax, a, b}, if u<umin then u is set to umin, and if u>umax then u is set to umax. This guarantees that the scaled score will lie in the desired scoring range. The driver scaled score parameter, s, is then given by the formula $$s = 100 - 100/(1 + \exp(-a * \ln(u) - b))$$

The driver score 120 is finally determined as a weighted average of the driver segment scores, where each segment is weighted by the percentage of data contained in that segment relative to the driver's entire data set. In other words, the driver score 120, $s_d$, is computed as $$s_d = \frac{1}{t} \sum_{i=1}^{N} t_i s_i$$

where t is the total driving duration of a driver over the N trips considered, $t_i$ is the driving duration within each segment i, and $s_i$ is the segment score. For example, consider the driver that primarily commutes around San Diego with occasional trips to Los Angeles. An example breakdown of this driver's data may be consist of 5 driver segments: A (phone, low speed, sedans, USA, CA, San Diego), B (phone, high speed, sedans, USA, CA, San Diego), C (phone, high speed, sedans, USA, CA), D (phone, low speed, sedans, USA, CA, Los Angeles), and E (phone, high speed, sedans, USA, CA, Los Angeles). If the driver spends 40% of the time under conditions for A, 30% for B, 10% for C, 10% for D, and 10% for E, the driver score 120 is computed from the segment scaled scores as $s_d = 0.4s_A + 0.3s_B + 0.1s_C + 0.1s_D + 0.1s_E$.

F. Population Evaluation

The system also allows for populations to be evaluated relative to each other. This can be used to better understand how behavior is affected by certain variables or whether certain variables influence driving behavior at all. For example, the driving patterns of large trucks may be significantly different than that of motorcycles. Conversely, the driving patterns within cities around the United States may be similar to each other. By comparing the features of these populations, those differences can be assessed.

An interpretable population score can be determined by creating a distinct set of scaling parameters 116 for the distribution of population features 110. This is done in the same manner as for the trip relative score parameters but instead uses the population features 110 directly. This specific set of population scaling parameters 116 {pmin, pmax, ap, bp} can be computed as $$p_{min} = \exp(\mu_p - 3.402 * \sigma_p)$$

$$p_{max} = \exp(\mu_p + 4.641 * \sigma_p)$$

$$a_p = 0.85/\sigma_p$$

$$b_p = -1.0 - a_p * \mu_p$$

where $\mu_p$ and $\sigma_p$ are the mean and standard deviation of the distribution of the natural logs of the population feature values for each scoring field. Then for a specific population feature value, p, if p<pmin then p is set to pmin, and if p>pmax then p is set to pmax. The scaled population score, $s_p$, is then given by the formula $$s_p = 100 - 100/(1 + \exp(-a_p * \ln(p) - b_p))$$

The system uses this ability to evaluate populations relative to each other in order to ultimately merge populations as the set of driving variables grows. When two or more populations exhibit similar driving patterns, these populations can be grouped together to limit the number of classification possibilities the system needs to monitor. This can be used to remove variables that do not have a significant effect on driving behavior (i.e., if all of the populations are distinct because of the same variable but exhibit the same driving scores), or potentially merge variables into a more general class (e.g., vehicle make and model can potentially be merged into vehicle class, individual cities can be merged into large v. small city, etc.).

X. Applications

The system described here can be used for a variety of purposes. Three general categories of which this system is directly applicable are: driving safety and risk assessment, driving related identification and classification problems, and driver experience enhancement. Some specific applications are described further below.

A. Safety and Risk Assessment

Understanding how well a driver performs relative to a set of drivers can be used by auto insurers to measure the relative risk associated with insuring one driver versus another. This can be used to provide discounts on auto insurance to the better drivers or higher rates to those exhibiting poor driving behavior.

The system can be used to identify which driving conditions or variables (e.g., time of day, intersection types, road geometry, etc.) increase the risk of driving-behavior related accidents. This can be used by governments and institutions to better devote resources to improve safety conditions or emergency responder times. Similarly, these institutions can use the system to identify newly formed road hazards (e.g., recent accident, pothole, etc.) by monitoring sudden changes in behavior within a given population.

Figure 10:
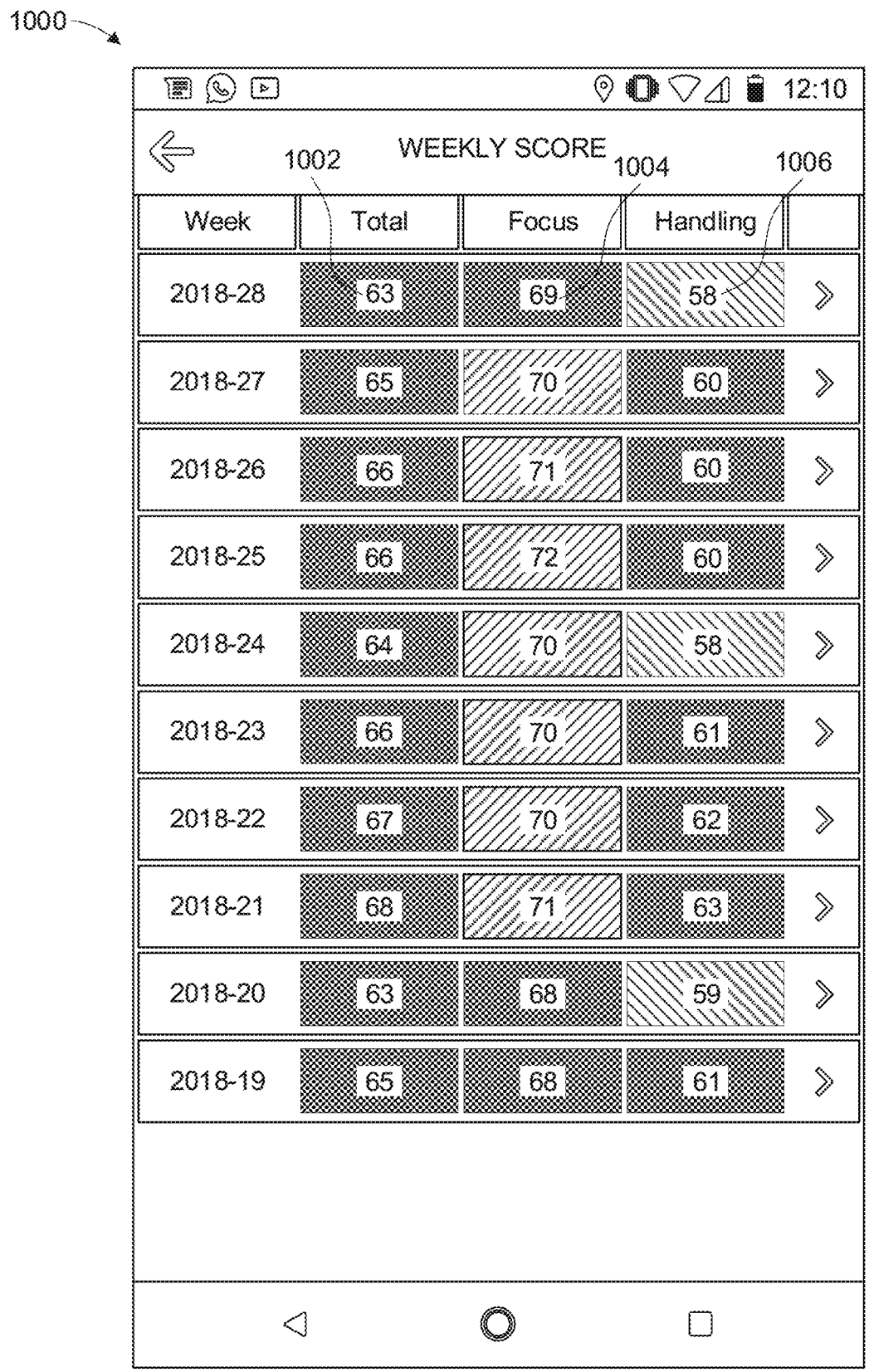
FIG. 10 illustrates a weekly score summary page for exemplary user interface for the technique for relative driver scoring using contextual analytics.

The system can be used to increase safe driving habits on a global scale. By targeting specific areas in which a driver performs poorly relative to his/her peers, the driver can be provided feedback and coaching to improve in this area. In some embodiments, 1) the driver is given a weekly feedback report that looks at their current score and compares it to its previous score (FIG. 10). Tips can be given based on the trends observed that week as well as overall performance (e.g., the driver's score may be still bad but the driver is improving) and 2) for employees, the manager has access to the driving scores and can provide their own feedback, coaching, etc. Since the scoring is always relative to a more general population (i.e., a driver's behavior may improve but not as well as the overall group), the system continually improves the driving behavior of the overall population.

B. Identification and Classification

The system may be used as a method to identify and distinguish between vehicle drivers using behavioral biometrics (i.e., the driving style patterns unique to an individual). The features of a given trip can be compared to a set of driver behavior features. The system then determines the probability that the observed trip features 106 match a specific driver model. That probability is then compared to the likelihood that the observations represent random or background trip motion data 102. The driver that has the highest probability is then the one that is assigned to the trip unless the background model has the highest probability, in which case the trip is considered to belong to a new driver.

In a similar method, the system can be used to distinguish whether a known person is the driver or a passenger for a given trip. If trip data is recorded and associated with a specific person, the trip features 106 can be compared to the driver features 114 associated with that person. If there is a significant difference in the behavior detected during that trip compared to the known behavior of that person, it is likely the person is a passenger in the vehicle.

The system can similarly be used to detect vehicle type for a known driver (i.e., detecting whether a known driver is on a motorcycle or in a car). If trip data is collected and associated with a known driver, evaluating the trip relative to population data for different vehicle types can allow for the vehicle type to be determined. These applications can be used to adjust auto insurance rates and to evaluate auto insurance claims.

C. User Experience

The system may be used as a method to match people (e.g., driver and passenger) based on their driving styles. This method leverages the assessment of driving behavior as well as a method to measure similarity between two drivers. The system ranks possible pairings with respect to their similarity with the goal to prefer more similar pairings over less similar pairings in order to increase the level of comfort for a passenger during a shared ride.

Similarly, this system can be used to better train autonomous driving systems to make passengers more comfortable riding in a self-driving car. The autonomous system can be tuned to better accommodate specific populations in which the car operates. The self-driving car can additionally adjust its driving style depending on which conditions it is currently operating under as well as the driving behavior preferences of the passenger in the car.

The system may also be used for driver-to-vehicle matching. That is, for consumers looking to purchase or rent a vehicle, knowledge of the driver's tendencies can assist in identifying vehicle classes, makes, models, etc. that the driver will more likely prefer.

The system may potentially have a large impact on improving the performance of electric vehicles. The energy discharge and storage mechanisms can be tuned to fit particular driving profiles that can potentially increase the range of the vehicle by a significant amount. By characterizing the driving behavior of different regions, car manufacturers can preload battery profiles onto the vehicle based on where it is being shipped thus improving the performance for the consumer. Similarly, if the battery profiles can be altered through software, the electric vehicle may alter its profile after learning the driving behavior of the primary driver and additionally may alter profiles based on current driving conditions (e.g., high speed v. low speed).

Figure 7:
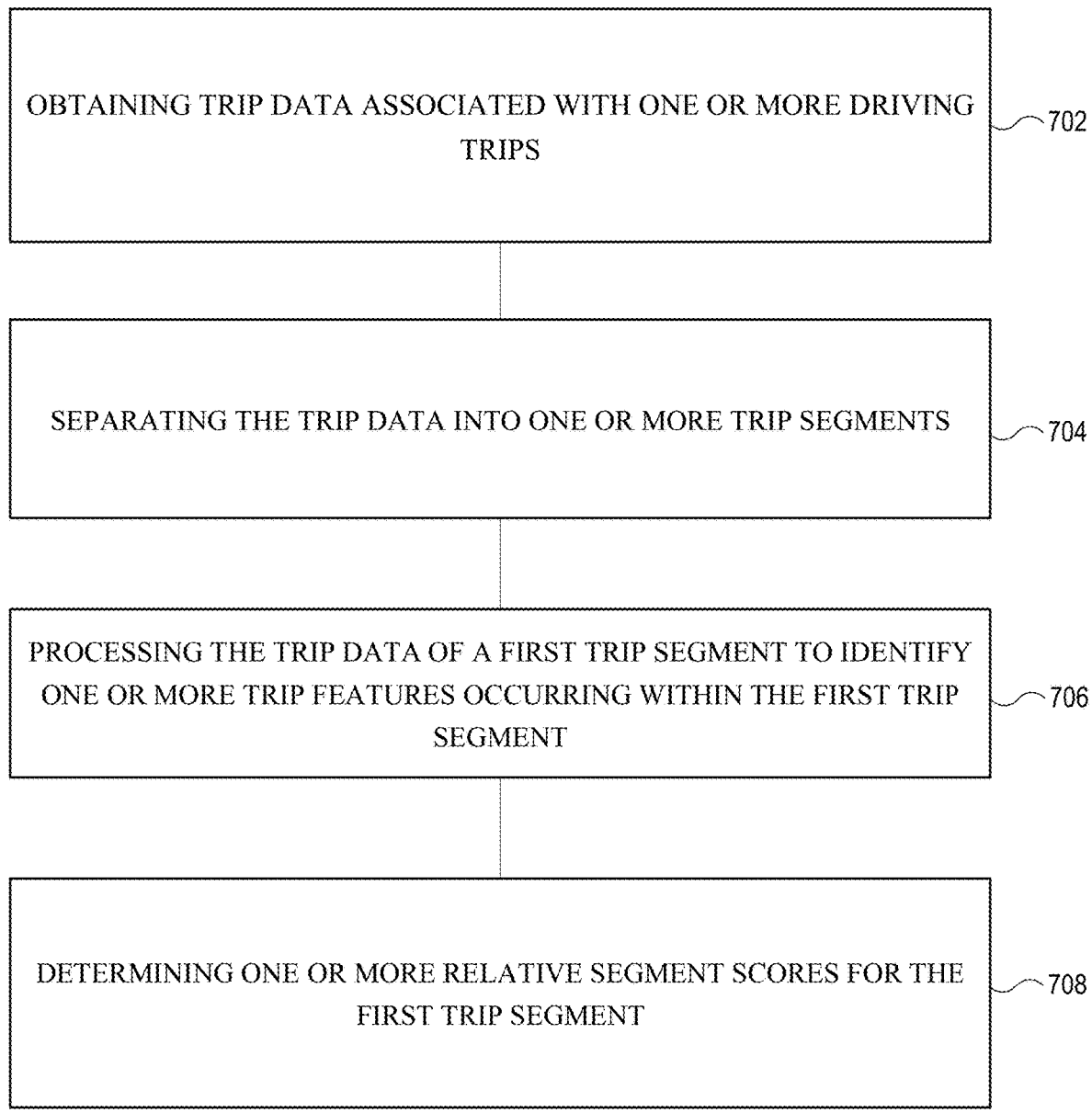
FIG. 7 depicts an exemplary flow diagram for the technique for relative driver scoring using contextual analytics.

FIG. 7 depicts an exemplary flow chart for a method for relative driver screening using contextual analytics 700. At 702, the method includes obtaining trip data with one or more driving tips. In some embodiments, the data can be collected via an application on a portable electronic device such as a smartphone. In some embodiments, the data can be saved in a memory of the portable electronic device. In some embodiments, the data can be transmitted via a wired or wireless connection over to a central database. In some embodiments, the central database can be a cloud storage. In some embodiments, the data can be transferred directly to the central database through a data cable. In some embodiments, the data can be periodically transferred, in whole or in part, from the portable electronic device to the central database.

At 704, the method includes separating the trip data into one or more trip segments. In some embodiments, each trip segment can be associated with one or more populations of a plurality of populations. In some embodiments, each population is associated with one or more population characteristics and one or more population features. The plurality of populations, the population characteristics, and the one or more population features are described above.

At 706, the method includes processing the trip data of a first trip segment to identify one or more trip features occurring within the first trip segment. In some embodiments, the trip features comprise one or more of the following: event features and behavior features. In some embodiments, wherein each event feature indicates an instance in which the processed trip data exceeds one or more event feature thresholds. In some embodiments, each behavior feature corresponds to a representation of vehicle movement over the duration of the first trip segment. The event and behavior features are described above.

At 708, the method includes determining one or more relative segment scores for the first trip segment. In some embodiments, each relative segment score indicates a comparison between one or more trip features of the first trip segment and one or more population features of the one or more populations.

XI. User Interface

Figure 8:
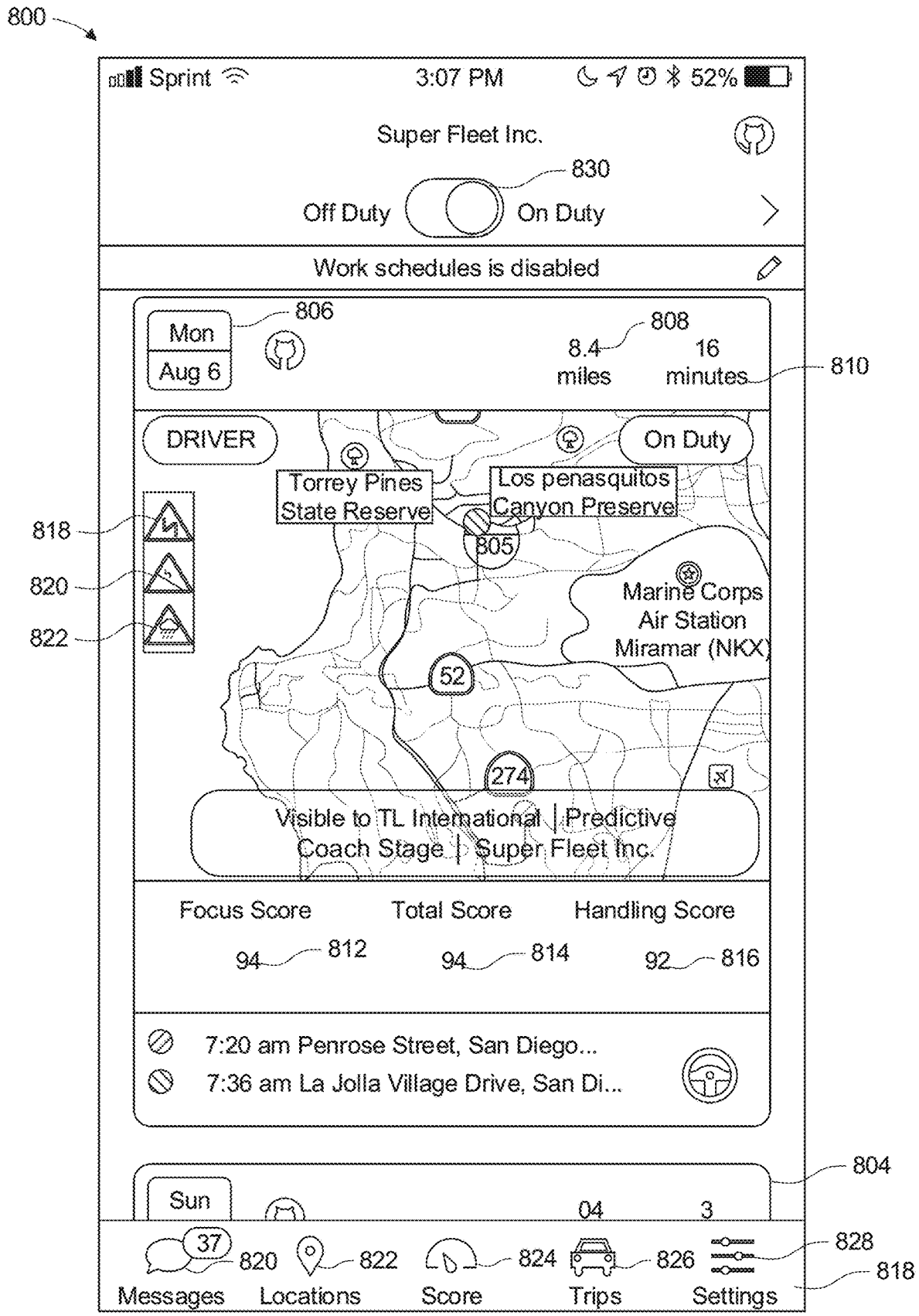
FIG. 8 illustrates an exemplary graphical user interface for the technique for relative driver scoring using contextual analytics.

FIG. 8 depicts an exemplary embodiment of a graphical user interface for a driver according to the disclosure herein. The graphical user interface illustrated in FIG. 8 is the trips user interface for a driver 800. In one embodiment, the trips user interface depicts a first summary section 802 and a second summary section 804 providing a summary of the driver's two most recent trips. In some embodiments, each summary section can provide the date of the trip 806, the trip distance 808, and the trip time 810. Each summary section can also depict the focus score 812, the driver's total score 814, and the handling score 816. Scores between 0 and 50 can be color coded red. Scores between 50 and 60 can be color coded orange. Scores between 60 and 70 can be color coded yellow and scores between 70 and 100 can be color coded green. Contextual indicators can also be displayed on the trips user interface for a driver 800. For example, in FIG. 8 the contextual indicators of windy roads 818, hills 820, and rain 822 are depicted. These symbols are used indicate the feedback of the contextual aspect of the score. Any of the other views that are described after can also (and do) incorporate the contextual information.

In one embodiment of the trips user interface 800, a selection bar 818 at the bottom of the user interface display. The selection bar 818 allows a driver to select the message screen 820, the locations screen 822, the trips user interface screen 826, or the settings screen 828. In some embodiments, the trip screen has a selector 830 to inform the application if the driver is on duty or off duty.

Figure 9:
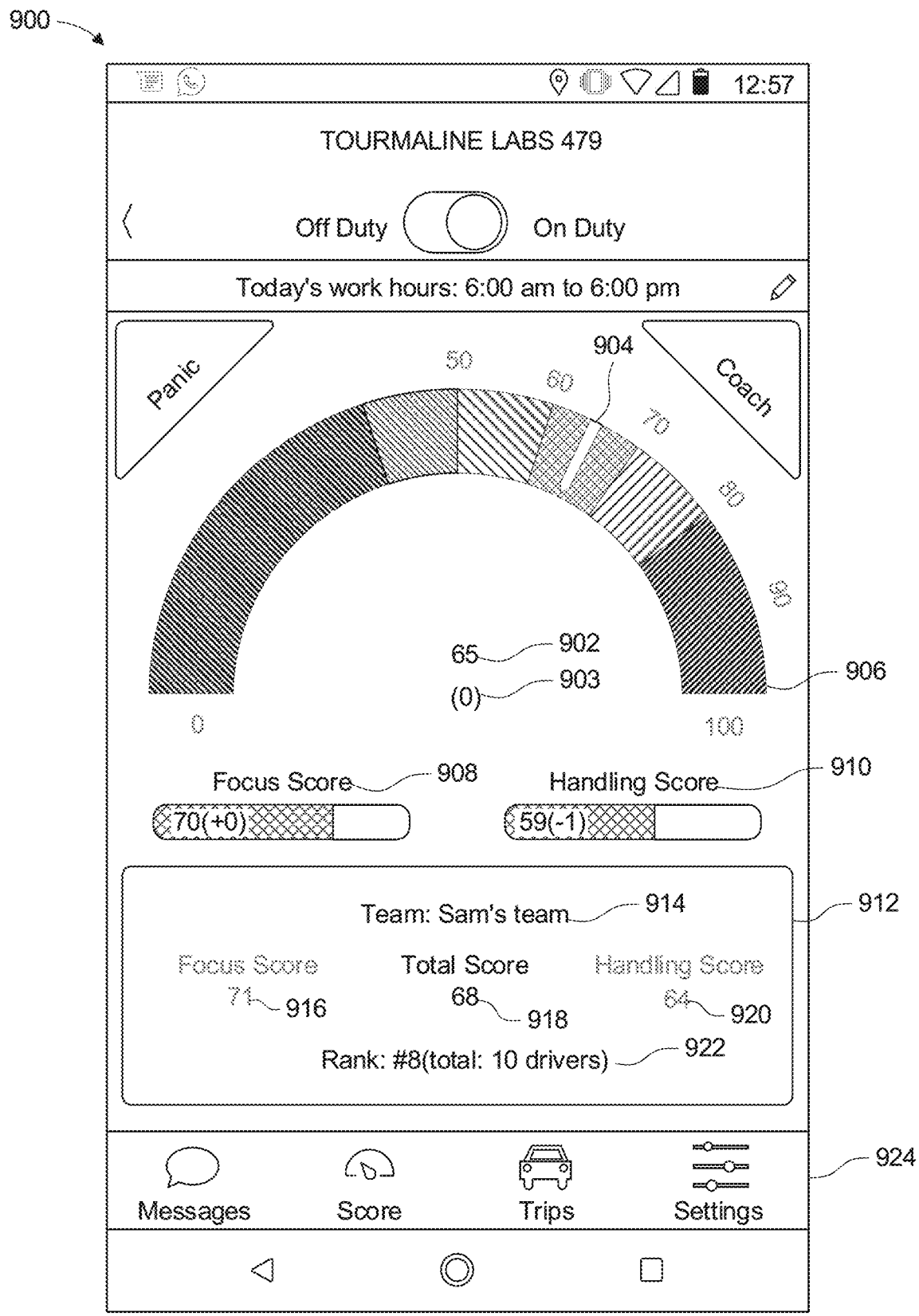
FIG. 9 illustrates a score page for exemplary user interface for the technique for relative driver scoring using contextual analytics.

FIG. 9 illustrates an embodiment of the score page 900. The score page 900 illustrates a driver score as a numerical value 902, a change indicator 903, and a bar indicator 904 with a range 906 from 0 to 100. The score page 900 also depicts a focus score 908 and a handling score 910 for a driver. In some embodiments, the score page 900 can present a team summary section 912. The team summary section 912 can depict the team name 914, the team's focus score 916, the team total score 918, the team's handling score 920. In some embodiments, the team summary section 912 can also depict the ranking 922 of all the drivers for the team. In some embodiments a selection bar 924 allows for changing the pages of the application.

FIG. 10 illustrates a weekly score summary page 1000. This page depicts a listing of weeks providing the total score 1002 for the week, the focus score 1004 for the week, and the handling score 1006 for the week. The scores can be color coded to correspond with the score page. Scores between 0 and 50 can be color coded red. Scores between 50 and 60 can be color coded orange. Scores between 60 and 70 can be color coded yellow and scores between 70 and 100 can be color coded green.

Figure 11:
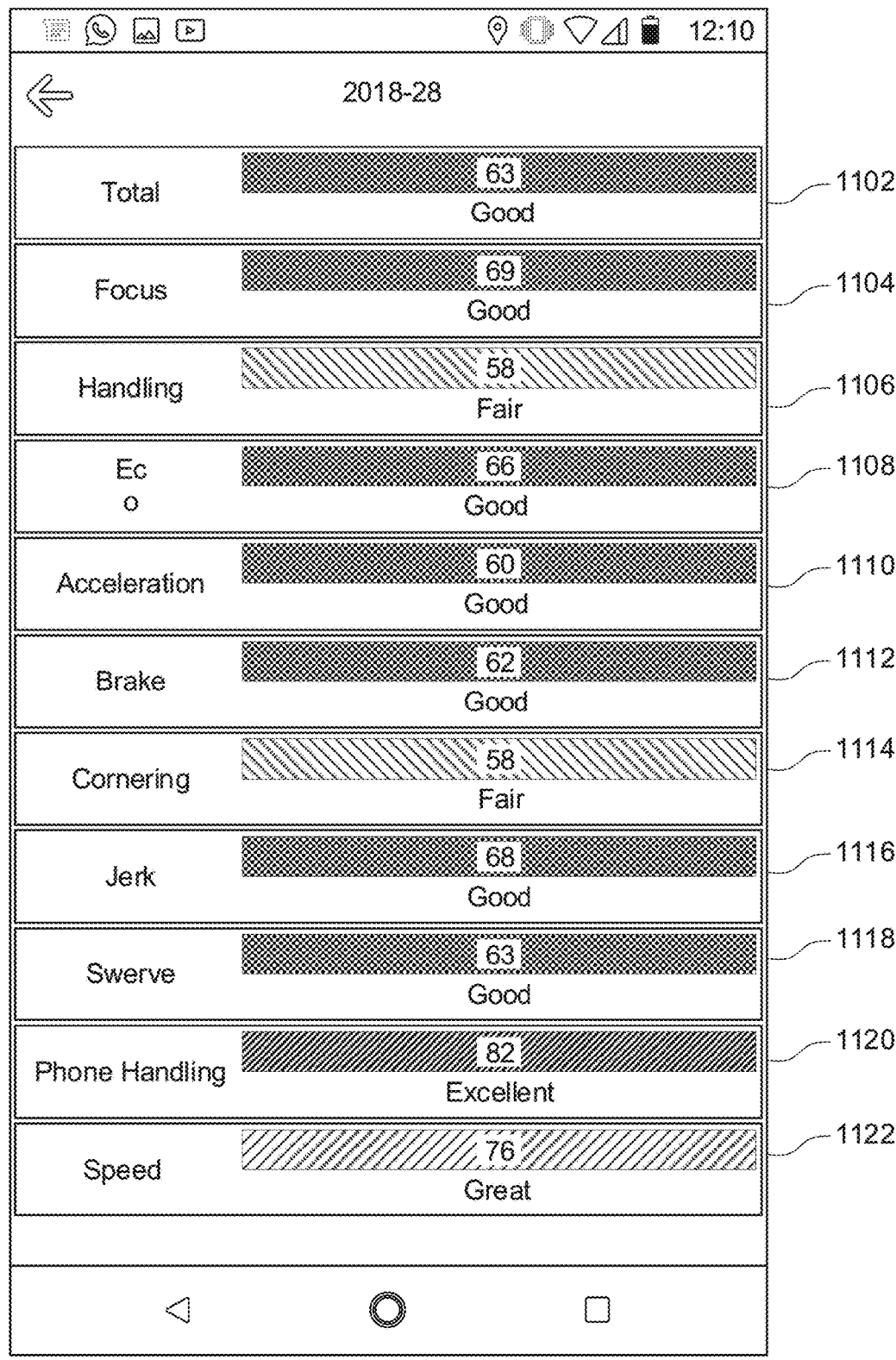
FIG. 11 illustrates a score detail page for an exemplary user interface for the technique for relative driver scoring using contextual analytics.

FIG. 11 illustrates a score detail page 1100. In one embodiment, the score detail page 1100 provides a details concerning the weekly total score 1102. In some embodiments, the details page and present scores for focus 1104, handling 1106, eco 1108, acceleration 1110, braking 1112, cornering 1114, jerk 1116, swerve 1118, phone handling 1120, and speed 1122. The score detail page 1100 can be adjusted as different parameters are monitoring. The scores can be color coded to correspond with the score page. Scores between 0 and 50 can be color coded red. Scores between 50 and 60 can be color coded orange. Scores between 60 and 70 can be color coded yellow and scores between 70 and 100 can be color coded green.

Figure 12:
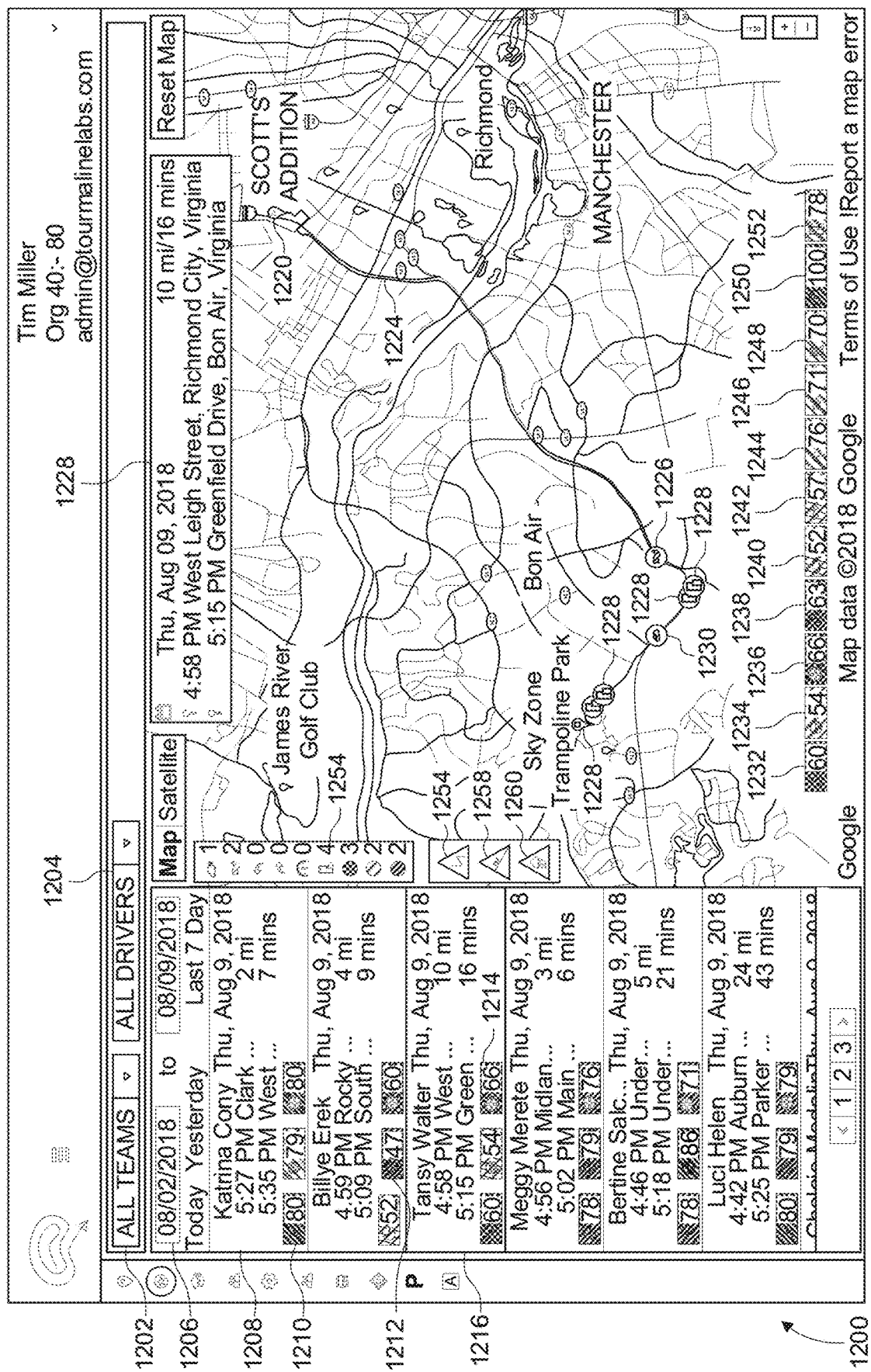
FIG. 12 illustrates a illustrates an exemplary embodiment of a driver scores web manager view page for the technique for relative driver scoring using contextual analytics.

FIG. 12 illustrates an exemplary embodiment of a driver scores web manager view page 1200. The manger view page 1200 allows for team selection 1202 and driver selection 1204. In some embodiments "all teams" can be selected for team selection 1202 and "all drivers" can be selected for driver selection 1204. The manager view page 1200 allows for date range selection 1206. In some embodiments, the current date, and the date range features allow for selection of the date range to be viewed. In some embodiments, the driver selection page 1200 allows for listing one or more trip summary 1208 boxes. In some embodiments, the trip summary 1208 lists a name of the driver, a day and date for the trip, a time for trip start and a time for trip end, a location for trip start and a location for trip end, a distance for the trip, and the elapsed time for the trip. In some embodiments, the trip summary box 1208 can list a total score for the trip 1210, a driver handling score 1212 for the trip, a handling score 1214. The manger view page 1200 allows for selection of a trip summary 1208 to display a graphical depiction of the selected trip. In some embodiments, the trip summary 1208 can be displayed on a map view. In some embodiments the trip summary 1208 can be display on a satellite view. For example, in FIG. 12, a Aug. 9, 2018 trip is selected for driver Tansy Walter. In some embodiments, the selected trip is shaded to indicate selection.

FIG. 12 displays additional details for the selected trip for the selected trip summary 1208. In the detail screen a summary box 1218 can be depicted at the top of the screen. The details screen can display a starting location 1220 and an ending location 1222. In some embodiments a route line 1224 can connect the starting location 1220 and the ending location 1222. In some embodiments, the events that affect a driver's score can be depicted along the route line 1224. For, a jerking 1226, phone handling 1228, and acceleration symbol 1230 are depicted along the route line 1224. The symbols can be color coded to indicate the severity of the infraction. In some embodiments, the details screen can display total score 1232, handling score 1236, focus score 1238, eco score 1240, acceleration score 1242, jerk 1244, cornering 1244, swerve 1246, handling 1248, speed 1250, and phone handling 1252 for the selected trip. In some embodiments, the scores can be color coded to correspond with the score page. Scores between 0 and 50 can be color coded red. Scores between 50 and 60 can be color coded orange. Scores between 60 and 70 can be color coded yellow and scores between 70 and 100 can be color coded green.

An incident summary table 1254 can also provide a list of the incidents recorded along the route that affected the driver's score. For example, along the route displayed, one incident of excessive acceleration, two instances of jerking, and four instances of phone handling were detected. Contextual indicators can also be displayed on the details screen. For example, in FIG. 12 the contextual indicators of windy roads 1256, hills 1258, and rain 1260 are depicted. These symbols are used indicate the feedback of the contextual aspect of the score. Any of the other views that are described after can also (and do) incorporate the contextual information.

FIG. 13 illustrates a score detail web page 1300. In one embodiment, the score detail web page 1300 provides a details concerning the weekly total score 1302. In some embodiments, the details page and present scores for handling 1304, focus 1306, eco 1308, acceleration 1310, braking 1312, cornering 1314, swerving 1316, jerking 1318, speeding 1320 and phone handling 1322, and speed 1122. The score detail page 1100 can be adjusted as different parameters are monitoring. The scores can be color coded to correspond with the score page. Scores between 0 and 50 can be color coded red. Scores between 50 and 60 can be color coded orange. Scores between 60 and 70 can be color coded yellow and scores between 70 and 100 can be color coded green. The score detail web page 1300 can provide both driver scores 1324 and company scores 1326 for each of the different parameters. The scores can also be color coded as described above. The score detail web page 1300 also can include coaching feedback 1328 for each of the different parameters. The feedback for these scores may also include more specific contextual information, such as "your braking score was based on your tendency to brake severely in highway conditions, and harder than average on hilly roads." This applies to the discussion on FIG. 13.

FIG. 14 illustrates a driver detail web page 1400. The driver detail web page 1400 can present the name of the driver 1402, the driver score 1404, the average score for the company 1406, and acknowledgement indication 1408, a Sent value 1410, and total miles 1412 for the driver. The scores can be color coded to correspond with the score page. Scores between 0 and 50 can be color coded red. Scores between 50 and 60 can be color coded orange. Scores between 60 and 70 can be color coded yellow and scores between 70 and 100 can be color coded green.

Figure 15:
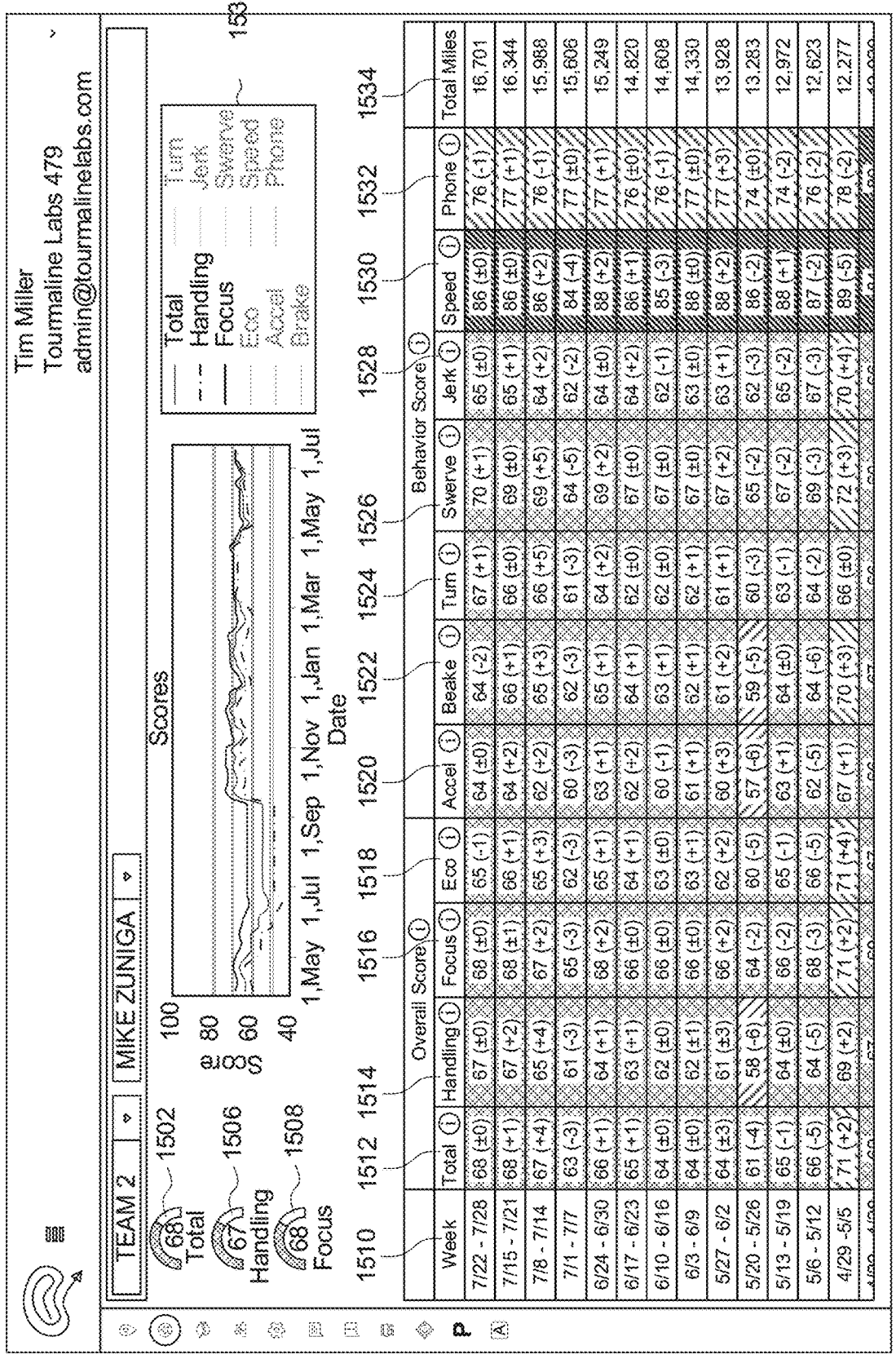
FIG. 15 illustrates a driver dashboard for an exemplary user interface for the technique for relative driver scoring using contextual analytics.

FIG. 15 illustrates a driver dashboard 1500. By way of example, the team selected for the driver dashboard in FIG. 15 is "Team 2" and the driver is "Mike Zuniga" The driver dashboard 1500 depicts a driver total score indicator 1502, a driver handling score indicator 1504, and a driver focus score indication 1506. The driver dashboard 1500 presents a weekly score summary table that lists the week 1510, the Total score 1512, the Handling score 1514, the Focus score 1516, the Eco score 1518, the Accel score 1520, the Brake score 1522, the Brake score 1522, the Turn score 1524, the Swerve score 1526, the Jerk score 1528, the Speed score 1530, and Phone score 1532, and the total miles 1534. The scores may be presented in a time history graph 1536 for an understanding of how scores change over time. Each score entry can include a change indicator depicting the score change from the previous week. The scores can be color coded to correspond with the score page. Scores between 0 and 50 can be color coded red. Scores between 50 and 60 can be color coded orange. Scores between 60 and 70 can be color coded yellow and scores between 70 and 100 can be color coded green.

Figure 16:
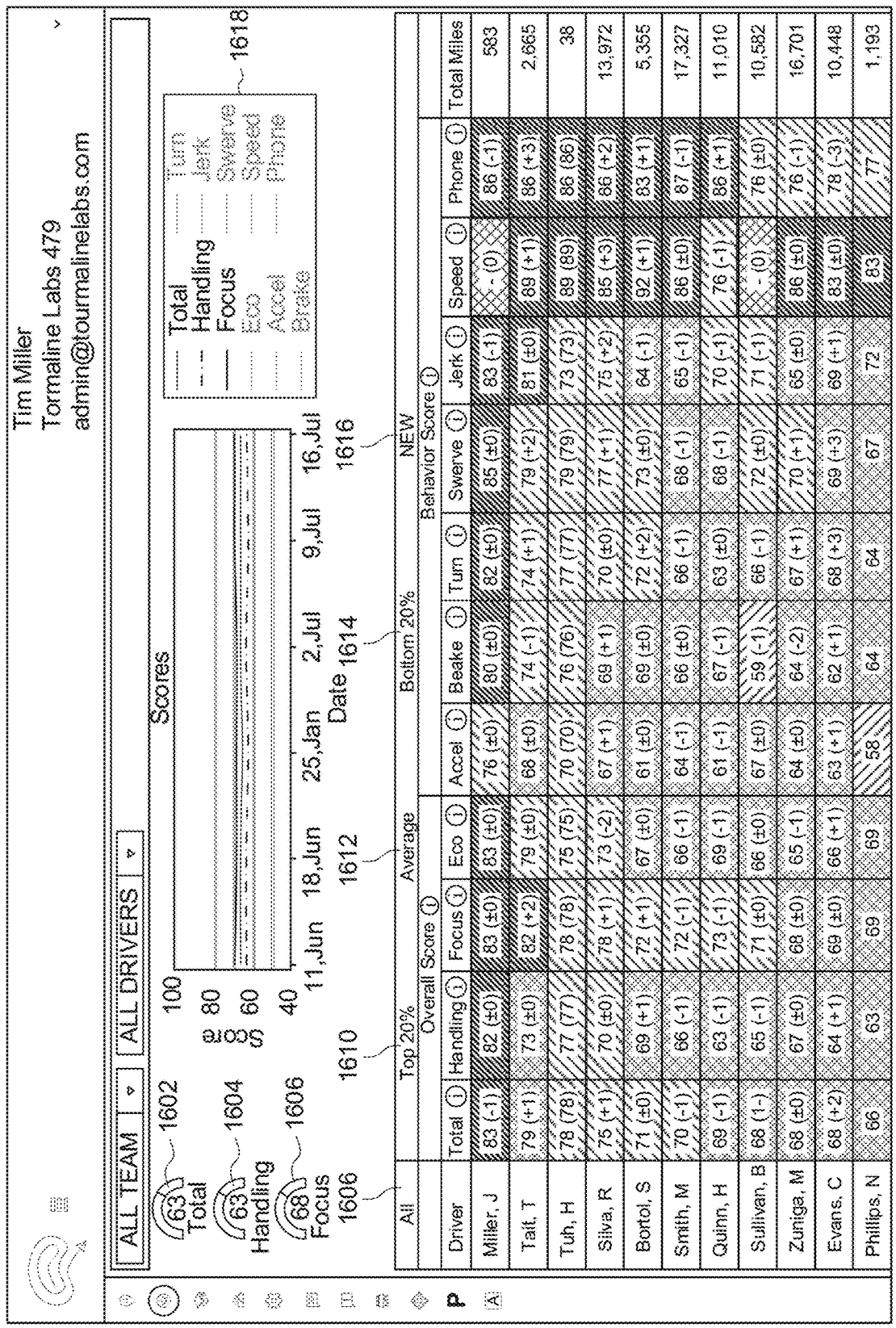
FIG. 16 illustrates a summary dashboard an exemplary user interface for the technique for relative driver scoring using contextual analytics.

FIG. 16 depicts a summary dashboard 1600. The summary dashboard 1600 presents a total average score indicator 1602, handling average score indicator 1604, and a focus average score indicator 1606. The summary dashboard 1600 allows for selection of All drivers 1608, Top 20% of drivers 1610, Average drivers 1612, Bottom 20% drivers 1614, and New drivers 1616. The summary dashboard 1600 presents a driver score summary table that lists the driver, the Total score, the Handling score, the Focus score, the Eco score, the Accel score, the Brake score, the Brake score, the Turn score, the Swerve score, the Jerk score, the Speed score, and Phone handling score, and the total miles. The scores may be presented in a time history graph 1618 for an understanding of how scores change over time. Each score entry can include a change indicator depicting the score change from the previous week. The scores can be color coded to correspond with the score page. Scores between 0 and 50 can be color coded red. Scores between 50 and 60 can be color coded orange. Scores between 60 and 70 can be color coded yellow and scores between 70 and 100 can be color coded green.

XII. Example Device

Figure 17:
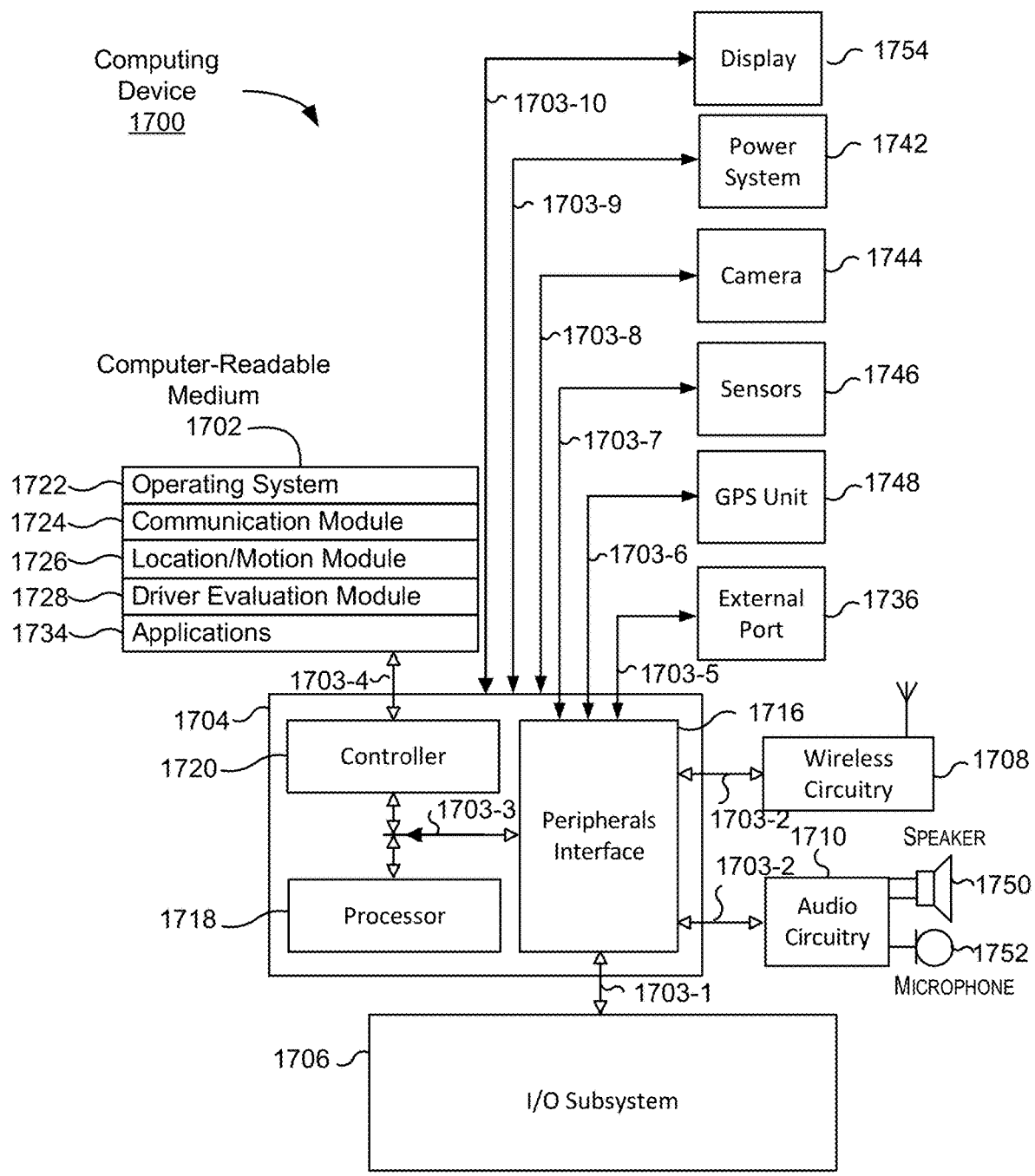
FIG. 17 illustrates a block diagram of an example device used for the technique for relative driver scoring using contextual analytics.

FIG. 17 is a block diagram of an example device 1700, which may be a mobile device. Device 1700 generally includes computer-readable medium (memory) 1702, a processing system 1704, an Input/Output (I/O) subsystem 1706, wireless circuitry 1708, and audio circuitry 1710 including speaker 1750 and microphone 1752. These components may be coupled by one or more communication buses or signal lines 1703. Device 1700 can be any portable electronic device, including a handheld computer, a tablet computer, a mobile phone, a smartphone, a laptop computer, tablet device, media player, a wearable device, personal digital assistant (PDA), a multifunction device, a vehicle display unit, or the like, including a combination of two or more of these items.

The device 1700 can be a multifunction device having a display 1754 such as touch screen in accordance with some embodiments. The touch screen optionally displays one or more graphics within user interface (UI). In some embodiments, a user is enabled to select one or more of the graphics by making a gesture on the graphics, for example, with one or more fingers or one or more styluses. In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 1700. In some implementations or circumstances, inadvertent contact with a graphic does not select the graphic. For example, a swipe gesture that sweeps over an application icon optionally does not select the corresponding application when the gesture corresponding to selection is a tap. Device 1700 can optionally also include one or more physical buttons, such as "home" or menu button. As menu button is, optionally, used to navigate to any application in a set of applications that are, optionally, executed on the device 1700. Alternatively, in some embodiments, the menu button is implemented as a soft key in a graphical user interface displayed on touch screen.

The device 1700 can incorporate a display 1754. The display 1754 can be a LCD, OLED, AMOLED, Super AMOLED, TFT, IPS, or TFT-LCD that typically can be found a computing device. The display 1754 may be a touch screen display of a computing device.

In one embodiment, device 1700 includes a touch screen, a menu button, a push button for powering the device on/off and locking the device, a volume adjustment button(s), a Subscriber Identity Module (SIM) card slot, a head set jack, and a docking/charging external port. The push button is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 1700 also accepts verbal input for activation or deactivation of some functions through microphone. Device 1700 also, optionally, includes one or more contact intensity sensors for detecting intensity of contacts on touch screen and/or one or more tactile output generators for generating tactile outputs for a user of device 1700.

In one illustrative configuration, device 1700 may include at least one computer-readable medium (memory) 1702 and one or more processing units (or processor(s)) 1718. Processor(s) 1718 may be implemented as appropriate in hardware, software, or combinations thereof. Computer-executable instruction or firmware implementations of processor(s) 1718 may include computer-executable instructions written in any suitable programming language to perform the various functions described.

Computer-readable medium (memory) 1702 may store program instructions that are loadable and executable on processor(s) 1718, as well as data generated during the execution of these programs. Depending on the configuration and type of device 1700, memory 1702 may be volatile (such as random access memory (RAM)) and/or non-volatile (such as read-only memory (ROM), flash memory, etc.). Device 1700 can have one or more memories. Device 1700 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the devices. In some implementations, memory 1702 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

Memory 1702 and additional storage, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. Memory 1702 and additional storage are both examples of non-transitory computer storage media. Additional types of computer storage media that may be present in device 1700 may include, but are not limited to, phase-change RAM (PRAM), SRAM, DRAM, RAM, ROM, electrically erasable programmable read-only memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by device 1700. Combinations of any of the above should also be included within the scope of non-transitory computer-readable storage media. Based on the disclosure and teachings provided herein, a person of ordinary skill in the art can appreciate other ways and/or methods to implement the various embodiments. However, as noted above, computer-readable storage media does not include transitory media such as carrier waves or the like.

Device 1700 may also contain communications connection(s) 1708 that allow device 1700 to communicate with a data storage, another device or server, user terminals and/or other devices via one or more networks. Such networks may include any one or a combination of many different types of networks, such as cable networks, the Internet, wireless networks, cellular networks, satellite networks, other private and/or public networks, or any combination thereof. Device 1700 may also include I/O device(s) 1706, such as a touch input device, a keyboard, a mouse, a pen, a voice input device, a display, a speaker, a printer, etc.

It should be apparent that the architecture shown in FIG. 17 is only one example of an architecture for device 1700, and that device 1700 can have more or fewer components than shown, or a different configuration of components. The various components shown in FIG. 17 can be implemented in hardware, software, or a combination of both hardware and software, including one or more signal processing and/or application specific integrated circuits.

Wireless circuitry 1708 is used to send and receive information over a wireless link or network to one or more other devices' conventional circuitry such as an antenna system, a radio frequency (RF) transceiver, one or more amplifiers, a tuner, one or more oscillators, a digital signal processor, a CODEC chipset, memory, etc. Wireless circuitry 1708 can use various protocols, e.g., as described herein. For example, wireless circuitry 1708 can have one component for one wireless protocol (e.g., Bluetooth®) and a separate component for another wireless protocol (e.g., ultra-wide band (UWB)). Different antennas can be used for the different protocols.

Wireless circuitry 1708 is coupled to processing system 1704 via peripherals interface 1716. Interface 1716 can include conventional components for establishing and maintaining communication between peripherals and processing system 1704. Voice and data information received by wireless circuitry 1708 (e.g., in speech recognition or voice command applications) is sent to one or more processors 1718 via peripherals interface 1716. One or more processors 1718 are configurable to process various data formats for one or more application programs 1734 stored on computer-readable medium (memory) 1702.

Peripherals interface 1716 couple the input and output peripherals of the device to processor(s) 1718 and computer-readable medium 1702. One or more processors 1718 communicate with computer-readable medium 1702 via a controller 1720. Computer-readable medium 1702 can be any device or medium that can store code and/or data for use by one or more processors 1718. Medium 1702 can include a memory hierarchy, including cache, main memory and secondary memory.

Device 1700 also includes a power system 1742 for powering the various hardware components. Power system 1742 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1700 includes a camera 1744. In some embodiments, device 1700 includes sensors 1746. Sensors 1746 can include accelerometers, compasses, gyrometers, pressure sensors, audio sensors, light sensors, barometers, and the like. Sensors 1746 can be used to sense location aspects, such as auditory or light signatures of a location.

In some embodiments, device 1700 can include a GPS receiver, sometimes referred to as a GPS unit 1748. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1718 run various software components stored in medium 1702 to perform various functions for device 1700. In some embodiments, the software components include an operating system 1722, a communication module (or set of instructions) 1724, a location module (or set of instructions) 1726, a driver evaluation module 1728 that is described herein, and other applications (or set of instructions) 1734.

Operating system 1722 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components. An operating system 1722 is system software that manages computer hardware and software resources and provides common services for computer programs. For example, the operating system 1722 can manage the interaction between the user interface module and one or more user application(s). The various embodiments further can be implemented in a wide variety of operating environments, which in some cases can include one or more user computers, devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Communication module 1724 facilitates communication with other devices over one or more external ports 1736 or via wireless circuitry 1708 and includes various software components for handling data received from wireless circuitry 1708 and/or external port 1736. External port 1736 (e.g., USB, FireWire, Lightning connector, 60-pin connector, etc.) is adapted for coupling directly to other devices or indirectly over a network (e.g., the Internet, wireless LAN, etc.).

Location/motion module 1726 can assist in determining the current position (e.g., coordinates or other geographic location identifiers) and motion of device 1700. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1726 receives data from GPS unit 1748 and analyzes the signals to determine the current position of the mobile device. In some embodiments, location/motion module 1726 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1708 and is passed to location/motion module 1726. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1700 based on the position coordinates of the corresponding transmitters. Regardless of the specific location technology used, location/motion module 1726 receives information from which a location fix can be derived, interprets that information, and returns location information, such as geographic coordinates, latitude/longitude, or other location fix data.

The driver evaluation module 1728 can comprise a series of instructions stored in memory 1702 that can be executed on the processor 1718. In some embodiments the driver evaluation module 1728 can collect driver data received from one or more sensors 1746 and the GPS unit 1748 on the device 1700. The driver evaluation module 1728 can store the collected data on the device 1700 in a computer readable medium 1702. The driver data can be transferred to a cloud server system through the wireless circuitry 1708. In some embodiments the data can be transferred to another computer via the external port 1736. In some embodiments, the driver evaluation module 1728 can process the collected data on the device 1700 using the one or more processors 1718. In some embodiments, the collected data is processed on an external database and the resulting scores are transmitted to the device 1700 and stored in memory 1702. In some embodiments, the processed data and resulting scores can be displayed on the display 1754. In some embodiments the driver evaluation module 1728 allows a user to select the desired data for display. In some embodiments, the driver evaluation module will provide alerts to the driver on the display 1754 or through the speaker 1750 to improve a driver's score.

The one or more applications programs 1734 on the mobile device can include any applications installed on the device 1700, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 1706 can be coupled to a display system (not shown), which can be a touch-sensitive display. The display system displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1706 can include a display and user input devices such as a keyboard, mouse, and/or track pad. In some embodiments, I/O subsystem 1706 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 1702) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1700 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art can appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer readable storage medium, representing remote, local, fixed, and/or removable storage devices as well as storage media for temporarily and/or more permanently containing, storing, transmitting, and retrieving computer-readable information. The system and various devices also typically can include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other devices such as network input/output devices may be employed.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

As described above, one aspect of the present technology is the gathering and use of data available from various sources to display rectangular content in non-rectangular areas. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The descriptions are not intended to be exhaustive or to limit the described embodiments to the precise forms disclosed. It will be apparent to one of ordinary skill in the art that many modifications and variations are possible in view of the above teachings. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

The use of the terms "a," "an," and "the," and similar referents in the context of describing the disclosed embodiments (especially in the context of the following claims), are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise be read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method for scoring driving behavior performed by a processor, the method comprising:

collecting trip data associated with one or more driving trips, the trip data comprising signals from one or more sensors that indicate one or more of acceleration, braking, turning, jerking, swerving, speeding, and phone movement;

separating the trip data into one or more trip segments having similar driving conditions, wherein each trip segment is associated with one or more populations of a plurality of populations, wherein each population is associated with one or more population characteristics and one or more population features that are common among the trip data, the population features representing an average number of events for each event type normalized to a particular trip distance;

processing first trip segment trip data of a first trip segment to identify one or more trip features occurring within the first trip segment, wherein the trip features comprise one or more of the following: event features and behavior features, wherein each event feature indicates an instance of time for one or more of the following events: acceleration, braking, turning, jerking, swerving, speeding, and phone movement in which the processed trip data for the instance of time in which the processed trip data exceeds one or more event feature thresholds, wherein each behavior feature corresponds to a representation of driving condition over a duration of the first trip segment, the behavior features including acceleration and at least one of braking, turning, speeding, and phone movement; and determining one or more relative segment scores for the first trip segment, wherein each relative segment score indicates a comparison between one or more trip features of the first trip segment and one or more population features of the one or more populations, wherein one or more of the population characteristics correspond to one or more of the following driving conditions: driver age, geographic location, source of trip data, vehicle speed, vehicle weight, vehicle type, time of day, traffic conditions, weather, topography, population density, and cultural norms;

determining one or more scaled segment scores by calculating a normal distribution of the one or more relative segment scores;

calculating a driver score by weighting and aggregating the one or more scaled segment scores; and displaying the driver score on a display.

2. The method of claim 1, wherein the trip data includes motion data comprising one or more of the following representations of driving conditions: location, vehicle bearing, velocity, acceleration, and jerk.

3. The method of claim 1, wherein a plurality of nonconsecutive trip segments associated with a population having one or more common population characteristics are processed as one trip segment.

4. The method of claim 1, wherein one or more of the population characteristics correspond to one or more of the following driving conditions: driver identity, driver age, geographic location, source of trip data, vehicle speed, vehicle weight, vehicle type, time of day, traffic conditions, weather, topography, population density, and cultural norms.

5. The method of claim 1, wherein the trip features occurring within the first trip segment are used to adjust population feature values of one or more of the associated populations.

6. The method of claim 5, wherein the relative segment scores for the first trip segment are determined prior to adjusting the population feature values of the one or more associated populations.

7. The method of claim 5, wherein the collecting trip data, separating the trip data, processing the first trip segment data, and determining the one or more relative segment scores is repeated for a plurality of driving trips, wherein each of the plurality of driving trips includes at least one trip segment associated with the one or more populations, wherein the trip data for said trip segments includes one or more driving conditions not included in the population characteristics of the one or more associated populations.

8. The method of claim 7, wherein a new population is created after the collecting trip data, separating the trip data, processing the first trip segment data, and determining the one or more relative segment scores is repeated a desired number of times, wherein the population characteristics for the new population comprise the population characteristics of the one or more associated populations and the one or more driving conditions not included in the one or more associated populations.

9. The method of claim 1, wherein one or more of the relative segment scores correspond to one or more of the following scoring metrics: aggression, distraction, eco, and overall performance.

10. The method of claim 1, wherein the relative segment scores are used to calculate one or more scaled segment scores, wherein scaled segment scores indicate a normalized distribution of the relative segment score.

11. The method of claim 10, wherein the trip data is further processed to calculated scaled segment scores for each trip segment of the driving trip, and wherein a trip score is calculated by weighting and aggregating a plurality of the one or more scaled segment scores.

12. The method of claim 10, wherein a plurality of trip segments from a plurality of driving trips are processed as one trip segment, each of the plurality of trip segments being associated with one or more of the populations having one or more common population characteristics and one or more common driving conditions.

13. The method of claim 12, wherein a driver score is calculated by weighting and aggregating a plurality of the one or more scaled segment scores.

14. The method of claim 1, wherein one or more of the event features correspond to one or more of the following events: acceleration, brake, turn, jerk, swerve, speeding, phone movement, and crash.

15. The method of claim 1, wherein one or more event feature thresholds are multi-variable event feature thresholds, each multi-variable event feature threshold comprising a function of a plurality of event feature thresholds.

16. The method of claim 1, wherein the trip data associated with the first trip segment is processed using event feature thresholds associated with the one or more associated populations.

17. The method of claim 1, wherein one or more of the behavior features correspond to one or more of the following behaviors: acceleration, braking, turning, jerk, swerve, and speeding.

18. The method of claim 17, wherein one or more of values for the behavior features is calculated using one or more of the following calculation methods: number of data samples, sum of data sample values, sum of the squares of the data sample values, and variance of the data sample values.

19. The method of claim 1, wherein the trip data is collected by a phone, and wherein the behavior features indicate the duration of the trip segment in which there was phone movement relative to the driving condition.

20. A non-transitory computer readable medium for storing processor-readable instructions configured to cause a processor to:
- collect trip data associated with one or more driving trips, the trip data comprising signals from one or more sensors that indicate one or more of acceleration, braking, turning, jerking, swerving, speeding, and phone movement;
- separate the trip data into one or more trip segments having similar driving conditions, wherein each trip segment is associated with one or more populations of a plurality of populations, wherein each population is associated with one or more population characteristics and one or more population features that are common among the trip data, the population features representing an average number of events for each event type normalized to a particular trip distance;
- process trip data of a first trip segment to identify one or more trip features occurring within the first trip segment, wherein the trip features comprise one or more of the following: event features and behavior features, wherein each event feature indicates an instance of time for one or more of the following events: acceleration, braking, turning, jerking, swerving, speeding, and phone movement in which the processed trip data for the instance of time in which the processed trip data exceeds one or more event feature thresholds, wherein each behavior feature measures driving condition over a duration of the first trip segment, the behavior features including acceleration and at least one of braking, turning, speeding, and phone movement; and
- determine one or more relative segment scores for the first trip segment, wherein each relative segment score indicates a comparison between one or more trip features of the first trip segment and one or more population features of the one or more populations, wherein one or more of the population characteristics correspond to one or more of the following driving conditions: driver age, geographic location, source of trip data, vehicle speed, vehicle weight, vehicle type, time of day, traffic conditions, weather, topography, population density, and cultural norms;
- determine one or more scaled segment scores by calculating a normal distribution of the one or more relative segment scores;
- calculate a driver score by weighting and aggregating the one or more scaled segment scores; and
- display the driver score on a display.

* * * * *